(12) United States Patent
Jin et al.

(10) Patent No.: US 11,082,652 B2
(45) Date of Patent: Aug. 3, 2021

(54) IMAGE SENSORS, IMAGE DETECTING SYSTEMS INCLUDING THE IMAGE SENSORS, AND METHODS OF OPERATING THE IMAGE SENSORS

(71) Applicant: Samsung Electronics Co., Ltd., Suwon-si (KR)

(72) Inventors: Younggu Jin, Suwon-si (KR); Youngchan Kim, Seongnam-si (KR); Min-Sun Keel, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/225,642

(22) Filed: Dec. 19, 2018

(65) Prior Publication Data

US 2019/0281241 A1 Sep. 12, 2019

(30) Foreign Application Priority Data

Mar. 8, 2018 (KR) .......................... 10-2018-0027622

(51) Int. Cl.
| | |
|---|---|
| *H04N 5/3745* | (2011.01) |
| *H04N 5/369* | (2011.01) |
| *H04N 5/374* | (2011.01) |
| *H04N 5/378* | (2011.01) |
| *H04N 5/359* | (2011.01) |
| *G01S 7/4863* | (2020.01) |

(52) U.S. Cl.
CPC ....... *H04N 5/36965* (2018.08); *G01S 7/4863* (2013.01); *H04N 5/3592* (2013.01); *H04N 5/378* (2013.01); *H04N 5/3742* (2013.01); *H04N 5/37452* (2013.01)

(58) Field of Classification Search
CPC ............ H04N 5/3742; H04N 5/36965; H04N 5/37452; H04N 5/378; H04N 5/3592; G01S 7/4863

See application file for complete search history.

(56) References Cited

U.S. PATENT DOCUMENTS

| 9,549,140 B2 | 1/2017 | Jung et al. |
| 9,602,742 B2 | 3/2017 | Nam |
| 9,743,022 B2 | 8/2017 | Oh et al. |

(Continued)

FOREIGN PATENT DOCUMENTS

| KR | 1020130085228 | 7/2013 |
| KR | 1020160023218 | 3/2016 |
| KR | 1020160041312 | 4/2016 |

*Primary Examiner* — Dave Czekaj
*Assistant Examiner* — Berteau Joisil
(74) *Attorney, Agent, or Firm* — Myers Bigel, P.A.

(57) ABSTRACT

Image sensors and methods of operating the image sensors are provided. The image sensors may include a pixel configured to generate an image signal in response to light incident on the pixel. The pixel may include a charge collection circuit configured to collect charges, which are produced by the light incident on the pixel, during a sensing period and a floating diffusion region. The image sensor may further include a storage unit configured to store the charges and, during a transfer period after the sensing period, configured to transfer at least a portion of the charges to the floating diffusion region. An amount of charges that is transferred from the storage unit to the floating diffusion region may be controlled by a voltage level of a storage control signal that is applied to a storage control terminal of the storage unit.

18 Claims, 16 Drawing Sheets

(56) References Cited

U.S. PATENT DOCUMENTS

| | | |
|---|---|---|
| 9,780,138 B2 | 10/2017 | Dupont |
| 9,966,407 B2 | 5/2018 | Kim et al. |
| 2005/0157194 A1 | 7/2005 | Altice, Jr. |
| 2006/0028567 A1* | 2/2006 | Kuwazawa ....... H01L 27/14609 348/294 |
| 2011/0199602 A1* | 8/2011 | Kim ..................... G01S 7/4863 356/5.01 |
| 2013/0188078 A1 | 7/2013 | Shim et al. |
| 2016/0049429 A1 | 2/2016 | Lee et al. |
| 2016/0119566 A1* | 4/2016 | Kususaki .......... H01L 27/14609 348/300 |
| 2020/0137330 A1* | 4/2020 | Van Dyck ............ G01S 7/4863 |

* cited by examiner

▨ : Charge

▨ : Charge

IMAGE SENSORS, IMAGE DETECTING SYSTEMS INCLUDING THE IMAGE SENSORS, AND METHODS OF OPERATING THE IMAGE SENSORS

CROSS-REFERENCE TO RELATED APPLICATION

This U.S. non-provisional patent application claims priority under 35 U.S.C. § 119 to Korean Patent Application No. 10-2018-0027622, filed on Mar. 8, 2018, in the Korean Intellectual Property Office, the contents of which are hereby incorporated in their entirety by reference.

BACKGROUND OF THE INVENTION

The present disclosure generally relates to the field of electronics and, more particularly, to an image sensor, an image detecting system including the same, and a method of operating the image sensor.

In a time-of-flight (TOF)-based image detecting system, an image sensor is used to calculate a distance between the system and a subject. A light source is provided in the image detecting system and is used to emit light toward the subject. The light emitted from the light source is reflected by the subject to be incident to the image sensor, and this may be used to calculate a distance to the subject. However, owing to external factors (e.g., external light) or internal factors (e.g., structural limitation of a pixel), there may be an error in calculating the distance to the subject. Thus, it may be beneficial to reduce such a distance error to be caused by various factors.

SUMMARY

Some embodiments of the inventive concept provide an image sensor including a pixel, which is configured to reduce an error in the TOF calculation by an external light and has a reduced size, an image detecting system including the image sensor, and a method of operating the image sensor.

According to some embodiments of the inventive concept, image sensors may include a pixel configured to generate an image signal in response to light incident on the pixel. The pixel may include a charge collection circuit configured to collect charges, which are produced by the light incident on the pixel, during a sensing period and a floating diffusion region. The image sensor may further include a storage unit configured to store the charges and, during a transfer period after the sensing period, configured to transfer at least a portion of the charges to the floating diffusion region. An amount of charges that is transferred from the storage unit to the floating diffusion region may be controlled by a voltage level of a storage control signal that is applied to a storage control terminal of the storage unit.

According to some embodiments of the inventive concept, image detecting systems may include a light source configured to emit an irradiation light in response to a first clock signal and an image sensor including a pixel, which is configured to sense a fraction of the irradiation light reflected by a subject and is configured to produce an image signal in response to the first clock signal and a second clock signal during a sensing period. The first and second clock signals may have opposite phases during the sensing period. The image detecting systems may further include a processor configured to calculate a distance between the image sensor and the subject, based on the image signal. The pixel may include a charge collection circuit configured to collect first charges, which are produced by an incident light, in response to the first clock signal, and configured to collect second charges, which are produced by the incident light, in response to the second clock signal, during the sensing period. The pixel may also include a floating diffusion region and a storage unit configured to store the first charges or the second charges and configured to transfer at least a portion of the first charges or at least a portion of the second charges to the floating diffusion region, based on a voltage level of a storage control signal that is applied to a storage control terminal of the storage unit. The pixel may further include a read circuit configured to produce the image signal, based on the at least the portion of the first charges or the at least the portion of the second charges transferred to the floating diffusion region.

According to some embodiments of the inventive concept, methods of operating an image sensor are provided. The image sensor may include a pixel configured to generate an image signal in response to an incident light, and the pixel may include a storage transistor and a floating diffusion node. The methods may include collecting charges, which are produced by the incident light, in the pixel, storing the charges in the storage transistor, in response to a first storage control signal applied to a control terminal of the storage transistor, transferring the charges to the floating diffusion node, in response to a second storage control signal having a voltage level lower than the first storage control signal, and producing the image signal, based on the charges transferred to the floating diffusion node.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concept will now be described more fully with reference to the accompanying drawings, in which example embodiments are shown. As used herein the term "and/or" includes any and all combinations of one or more of the associated listed items.

Figure 1:
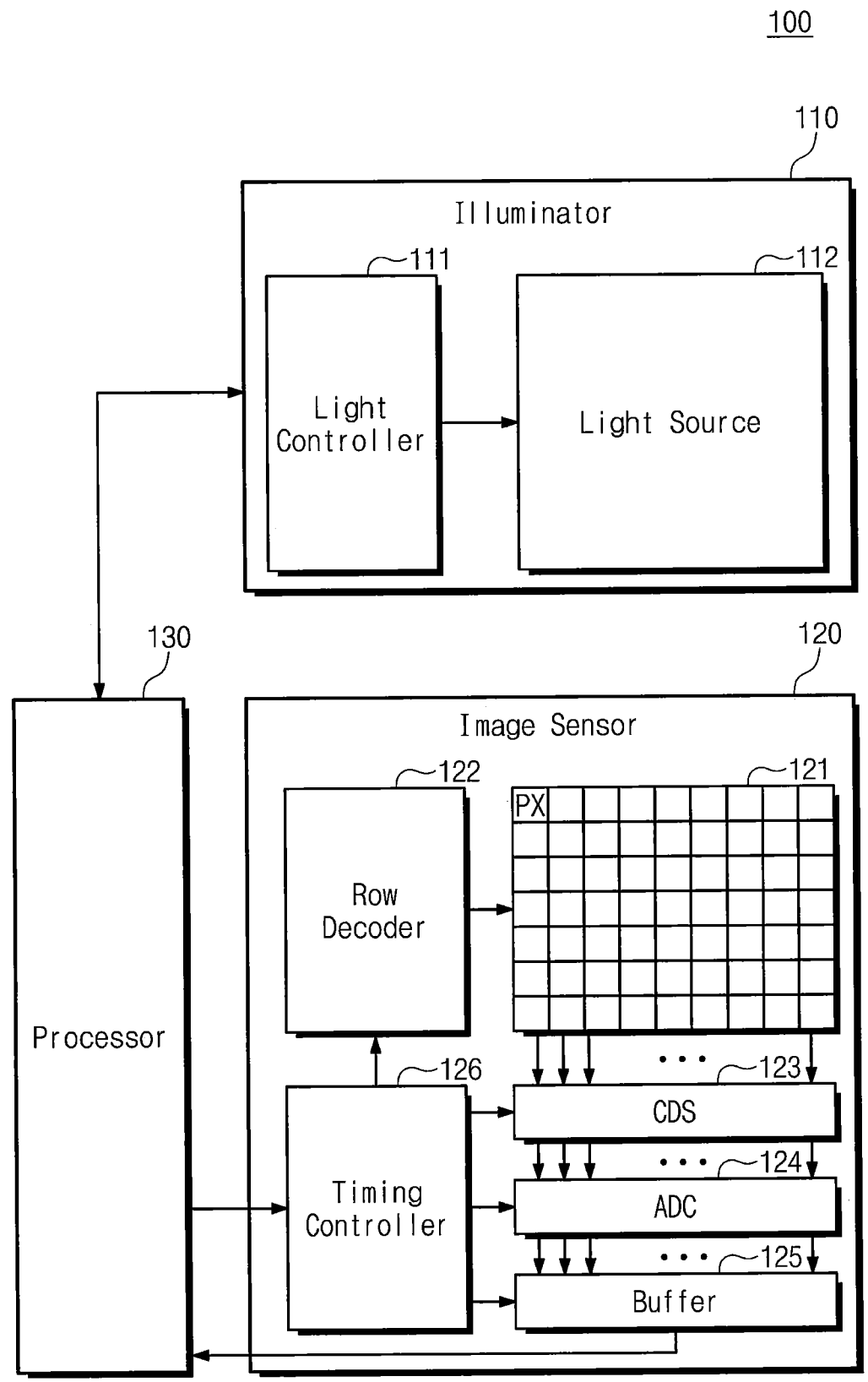
FIG. 1 is a block diagram of an image detecting system according to some embodiments of the inventive concept.

FIG. 1 is a block diagram of an image detecting system according to some embodiments of the inventive concept. Referring to FIG. 1, an image detecting system 100 may include an illuminator 110, an image sensor 120, and a processor 130. The image detecting system 100 may be used as a component in various electronic devices, such as digital cameras, smart phones, tablet PCs, or wearable devices.

The illuminator 110 may be configured to emit irradiation light to the outside of the illuminator 110. In some embodiments, the illuminator 110 may be configured to emit an invisible light (e.g., infrared light) as the irradiation light, but the inventive concept is not limited thereto. The illuminator 110 may include a light controller 111 and a light source 112.

The light controller 111 may control light-emitting operation of the light source 112. The light controller 111 may be configured to control a timing of an operation of emitting an irradiation light from the light source 112. For example, during an irradiation period in which the irradiation light is emitted, the light controller 111 may be configured to control a timing of a light-emitting operation of outputting the irradiation light in response to a clock signal to be toggled. However, the inventive concept is not limited thereto, and in some embodiments, the light controller 111 may control the light-emitting operation to allow the irradiation light to be emitted without any toggling, during at least a part of the irradiation period. In this case, the irradiation light may be emitted to have a specific pattern. Here, the specific pattern may be given to sense whether a reflected fraction of the irradiation light has a pattern deformed by a shape of a subject, and for example, the specific pattern may be a repeated pattern (e.g., a lattice or grid pattern).

The light source 112 may be configured to emit the irradiation light to the outside of the light source 112, under the control of the light controller 111. For example, the light source 112 may include a light-emitting diode, which is configured to generate light based on (e.g., in response to) electric signals transmitted from the light controller 111. The irradiation light generated by the light source 112 may be incident to the subject.

The image sensor 120 may be configured to sense a fraction of the irradiation light reflected by the subject. The image sensor 120 may also be configured to generate an image signal from the reflected fraction of the irradiation light and to convert such an image signal to an image data. The image sensor 120 may include a pixel array 121, a row decoder 122, a correlated double sampler (CDS) 123, an analog digital converter (ADC) 124, a buffer circuit 125, and a timing controller 126.

The pixel array 121 may be configured to sense light, which is incident from the outside, and to convert the sensed light to an electric signal (i.e., an image signal). The light to be incident into the pixel array 121 may include a reflected fraction of irradiation light. Furthermore, the light to be incident into the pixel array 121 may include an external light, in addition to the reflected fraction of the irradiation light. In the case where an intensity of the external light is high, it may be difficult to precisely sense the reflected fraction of the irradiation light.

The pixel array 121 may include a plurality of pixels that are two-dimensionally arranged. During a sensing period, each of the pixels may be configured to sense light to be incident from the outside. The sensing period may include a first sensing period and a second sensing period following the first sensing period. An output path of an image signal, which is produced from light sensed (e.g., incident light) during the first sensing period, and an output path of an image signal, which is produced from light sensed during the second sensing period, may be different from each other. The first sensing period may be the same as a period when the irradiation light is output. In other words, since it takes time for the irradiation light to be emitted from the light source 112, reflected by the subject, and then incident to the pixel array 121, a portion of the reflected fraction of the irradiation light may be sensed during the second sensing period. The traveling time of the irradiation light may be used to calculate a distance between the subject and the image detecting system 100.

The pixels of the pixel array 121 may be arranged in a plurality of rows, and the row decoder 122 may be used to select one or more rows of the pixels. The pixels in the selected row may provide converted image signals to the CDS 123. To do this, the row decoder 122 may be configured to generate a selection signal and to provide the selection signal to the pixel array 121, under the control of the timing controller 126.

The row decoder 122 may be configured to provide control signals, which will be used to perform various operations of each of the pixels, to the pixels, respectively. Each of the pixels may include a plurality of transistors, as will be described with reference to FIG. 2, and the pixel may be configured to perform various operations of collecting, storing, transferring, and/or removing electric charges, depending on the control signals to be provided to the transistors. The row decoder 122 may generate the control signals to be applied to the transistors, under the control of the timing controller 126, and the control signals will be described in more detail below.

The CDS 123 may be configured to remove a noise component from image signals to be output from the pixels, for example, in a correlated double sampling manner. As an example, in the CDS 123, a reset signal, which is generated based on (e.g., in response to) a reset operation of each of the pixels, may be compared with the image signal. Furthermore, in the CDS 123, a difference between the reset signal and the image signal may be used to remove a noise component from the image signal. The CDS 123 may be configured to output the image signal, from which the noise component is removed, to the ADC 124 on a column-by-column basis, under the control of the timing controller 126.

The ADC 124 may be configured to convert an analog signal, which is output from the CDS 123, to an image data which is a digital signal. The ADC 124 may convert an image signal, which is sampled on a column-by-column basis, to the image data, under the control of the timing controller 126. The buffer circuit 125 may store the image data temporarily and may output the stored image data to the processor 130, under the control of the timing controller 126.

The timing controller 126 may be configured to control an overall operation of the image sensor 120. For example, the timing controller 126 may provide control signals to the row decoder 122, the CDS 123, the ADC 124, and the buffer circuit 125 to drive the image sensor 120. To do this, the timing controller 126 may be configured to receive image sensor control signals from the processor 130.

The processor 130 may be configured to perform control and calculation operations of the image detecting system 100. The processor 130 may control the illuminator 110 to emit an irradiation light. Furthermore, the processor 130 may control the image sensor 120 to sense the reflected fraction of the irradiation light and to produce the image data.

The processor 130 may include an image signal processor (ISP, not shown), which is used to process the image data to be transmitted from the buffer circuit 125. The image signal processor may be configured to calculate a distance between a subject and the image detecting system 100 (e.g., a time-of-flight (TOF) value), based on the image data. For example, the processor 130 may calculate a delay time of the reflected fraction of the irradiation light, based on image data that are obtained by two or more sensing operations (e.g., a first sensing operation during the first sensing period and a second sensing operation during the second sensing period). The processor 130 may be configured to calculate the TOF value, based on the delay time. The processor 130 may determine information on physical configuration (e.g., distance, shape, and velocity) of the subject, based on the TOF value.

Figure 2:
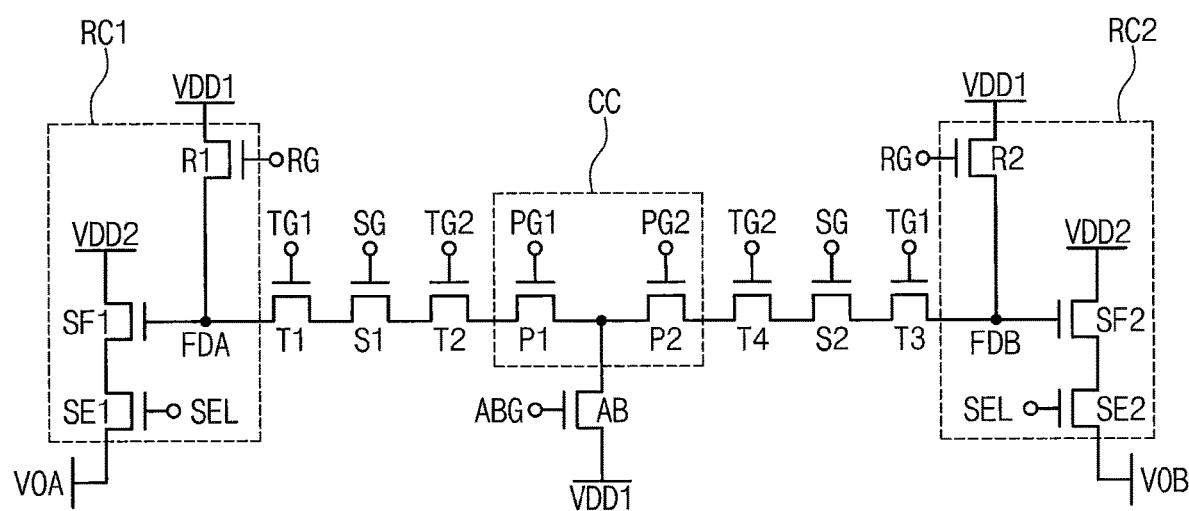
FIG. 2 is a circuit diagram of one of pixels included in a pixel array of FIG. 1 according to some embodiments of the inventive concept.

FIG. 2 is a circuit diagram one of pixels included in the pixel array 121 of FIG. 1 according to some embodiments of the inventive concept. Referring to FIG. 2, a pixel PX1 may include a charge collection circuit CC, first, second, third and fourth transfer transistors T1, T2, T3, and T4 (or transfer units), first and second storage transistors S1 and S2 (or storage units), first and second read circuits RC1 and RC2 (or read units), and an anti-blooming transistor AB. Depending on some conditions to be described below, at least one of the first to fourth transfer transistors T1-T4 may be omitted from the pixel.

For convenience in description, the description that follows will refer to an example in which the transistors in the pixel PX1 are NMOS transistors that are turned on when a high-level voltage is applied to a control terminal or a gate electrode. However, the inventive concept is not limited to this example, and in some embodiments, the transistors in the pixel PX1 may be PMOS transistors that are turned on when a low-level voltage is applied to the control terminal or the gate electrode. In other words, the inventive concept is not limited to the case, in which specific types of the transistors are used in the pixel PX1. One of the transistors included in the pixel PX1 may be an NMOS transistor or a PMOS transistor.

The charge collection circuit CC may be configured to collect electric charges, which are produced by (e.g., in response to) light incident to the pixel PX1. The light incident to the pixel PX1 may include a reflected fraction of the irradiation light emitted from the light source 112 of FIG. 1. The charge collection circuit CC may include a first photo gate transistor P1 and a second photo gate transistor P2. During the sensing period, the first and second photo gate transistors P1 and P2 may be configured to collect the electric charges to be produced by the light incident to the pixel PX1. The electric charges collected by the first and second photo gate transistors P1 and P2 may be used to calculate a time of flight of the irradiation light.

The first photo gate transistor P1 may be configured to collect electric charges, based on (e.g., in response to) a first photo gate signal PG1. The first photo gate signal PG1 may be toggled, during the sensing period. For example, the first photo gate signal PG1 may have the same phase as a clock signal for outputting the irradiation light. The first photo gate transistor P1 may be configured to sense light and to collect first charges, which are produced by the incident light, during a period of outputting the irradiation light.

The second photo gate transistor P2 may be configured to collect electric charges, based on (e.g., in response to) a second photo gate signal PG2. The second photo gate signal PG2 may be toggled, during the sensing period. In some embodiments, the first and second photo gate signals PG1 and PG2 may have opposite phases with respect to each other. In other words, the second photo gate signal PG2 may have a phase difference of 180° with respect to the clock signal for outputting the irradiation light. When the irradiation light is not emitted from the light source 112 of FIG. 1, the second photo gate transistor P2 may sense light and collect second charges, which are produced from the incident light.

Unlike the structure shown in FIG. 2, in some embodiments, the charge collection circuit CC may further include a third photo gate transistor, which is configured to collect electric charges in response to a third photo gate signal, and a fourth photo gate transistor, which is configured to collect electric charges in response to a fourth photo gate signal. For example, the third photo gate signal may have a phase difference of 90° with respect to the clock signal, and the fourth photo gate signal may have a phase difference of 270° with respect to the clock signal. The first to fourth photo gate transistors may be connected in parallel to each other. In this case, since the operation of sensing a reflected fraction of the irradiation light is performed based on four different phases, it may be possible to more precisely and quickly calculate a distance of a subject from an image sensor.

The storage units S1 and S2 may be configured to store electric charges collected by the charge collection circuit CC. The first storage transistor S1 may store first charges, which are collected by the first photo gate transistor P1, and then may transfer the first charges to a first floating diffusion node FDA, in response to a storage control signal SG. The second storage transistor S2 may store second charges, which are collected by the second photo gate transistor P2, and then may transfer the second charges to a second floating diffusion node FDB, in response to the storage control signal SG. In some embodiments, the first storage transistor S1 may store a portion of the first charges that are collected by the first photo gate transistor P1, and a portion of charges stored in the first storage transistor S1 may be transferred to the first floating diffusion node FDA. In some embodiments, the second storage transistor S2 may store a portion of the second charges that are collected by the second photo gate transistor P2, and a portion of charges stored in the second storage transistor S2 may be transferred to the second floating diffusion node FDB.

During the sensing period, the first storage transistor S1 may store the first charges in response to the storage control signal SG in a high-level state. When the storage control signal SG is in the high-level state, the first storage transistor S1 may store maximally electric charges, thereby having a maximum storage capacity. The first storage transistor S1 may be provided between the first and second transfer transistors T1 and T2 and may be used to connect the first and second transfer transistors T1 and T2 in series. In some embodiments, the first transfer transistor T1, the first storage transistor S1, and the second transfer transistor T2 are sequentially connected in series as illustrated in FIG. 2.

During a transfer period following the sensing period, the first storage transistor S1 may transfer the first charges to the first floating diffusion node FDA in response to the storage control signal SG in a low-level state. When the storage control signal SG is in the low-level state, the first storage transistor S1 may have a reduced storage capacity. Here, the first charges may be transferred to the first floating diffusion node FDA through the first transfer transistor T1.

Similar to the first storage transistor S1, during the sensing period, the second storage transistor S2 may store second charges in response to the storage control signal SG in the high-level state. During the transfer period, the second storage transistor S2 may transfer the second charges to the second floating diffusion node FDB in response to the storage control signal SG in the low-level state. The second storage transistor S2 may be provided between the third and fourth transfer transistors T3 and T4 and may be used to connect the third and fourth transfer transistors T3 and T4 in series. In some embodiments, the third transfer transistor T3, the second storage transistor S2, and the fourth transfer transistor T4 are sequentially connected in series as illustrated in FIG. 2.

Each of the first and second storage transistors S1 and S2 may be configured to have a charge storage capacity which is controlled by a voltage level of the storage control signal SG. For example, the storage capacity of the first storage transistor S1 may be controlled based on a voltage level of the storage control signal SG varying between the high level and the low level. In this case, some of the first charges may be transferred to the first floating diffusion node FDA. Even when the first floating diffusion node FDA has a small storage capacity, it may be possible to prevent an overflow issue from occurring in the first floating diffusion node FDA and to produce a reliable image signal, because the charge transfer process is controlled to allow only some of the first charges to be transferred to the first floating diffusion node FDA. The first and second storage transistors S1 and S2 may be configured to have the maximum storage capacities that are larger than the storage capacities of the first and second floating diffusion nodes FDA and FDB (or the floating diffusion regions), and this may allow the electric charges to be transferred in a sequentially divided manner.

The transfer units T1-T4 may be configured to control the transfer operation of the electric charges, which are collected by the charge collection circuit CC. The first and second transfer transistors T1 and T2 may be used to control the transfer operation of transferring the first charges, which are collected by the first photo gate transistor P1, to the first floating diffusion node FDA. The third and fourth transfer transistors T3 and T4 may be used to control the transfer operation of transferring the second charges, which are collected by the second photo gate transistor P2, to the second floating diffusion node FDB.

During the sensing period, a first transfer control signal TG1 in a low-level state may be applied to the first transfer transistor T1 to block (e.g., partially block, entirely block) or possibly prohibit the first charges from being transferred to the first floating diffusion node FDA. In some embodiments, during the sensing period, the first charges may not be transferred to the first floating diffusion node FDA by the operation of the first transfer transistor T1. During the transfer period, the first transfer control signal TG1 in a high-level state (in some embodiments, in the low-level state) may be applied to the first transfer transistor T1 to allow the first charges to be transferred to the first floating diffusion node FDA. The first transfer transistor T1 may be provided between the first storage transistor S1 and the first floating diffusion node FDA and may be used to connect the first storage transistor S1 and the first floating diffusion node FDA in series.

During the sensing period, a second transfer control signal TG2 in a high-level state may be applied to the second transfer transistor T2 to allow the first charges to be transferred to the first storage transistor S1. During the transfer period, the second transfer control signal TG2 in a low-level state may be applied to the second transfer transistor T2 to block (e.g., partially block, entirely block) the first charges, which are stored in the first storage transistor S1, from being transferred to the first photo gate transistor P1, and, in some embodiments, the second transfer control signal TG2 in a low-level state may be applied to the second transfer transistor T2 to block (e.g., partially block, entirely block) or possibly prohibit the first charges, which are stored in the first storage transistor S1, from being transferred to the first photo gate transistor P1. Furthermore, after the sensing period, the second transfer transistor T2 may be configured to block (e.g., partially block, entirely block) or possibly prohibit electric charges, which are produced by an external light to be incident into the first storage transistor S1, from being transferred to the first photo gate transistor P1. The second transfer transistor T2 may be provided between the first photo gate transistor P1 and the first storage transistor S1 and may be used to connect the first photo gate transistor P1 and the first storage transistor S1 in series.

Similar to the first transfer transistor T1, the third transfer transistor T3 may be configured to control an operation of transferring the second charges to the second floating diffusion node FDB, in response to the first transfer control signal TG1. The third transfer transistor T3 may be provided between the second storage transistor S2 and the second floating diffusion node FDB and may be used to connect the second storage transistor S2 and the second floating diffusion node FDB in series.

Similar to the second transfer transistor T2, the fourth transfer transistor T4 may be configured to control an operation of transferring the second charges to the second storage transistor S2, in response to the second transfer control signal TG2. The fourth transfer transistor T4 may be provided between the second photo gate transistor P2 and the second storage transistor S2 and may be used to connect the second photo gate transistor P2 and the second storage transistor S2 in series.

According to an amount of electric charges, which can be collected by the charge collection circuit CC, storage capacities of the first and second storage transistors S1 and S2, and storage capacities of the first and second floating diffusion nodes FDA and FDB, at least one of the first to fourth transfer transistors T1-T4 may be omitted from the pixel PX1. In some embodiments, one of the first to fourth transfer transistors T1-T4 may not be included in the pixel PX1. For example, in the case where the maximum storage capacity of the first storage transistor S1 is much larger than an amount of electric charges that can be collected by the first photo gate transistor P1, the second transfer transistor T2 may not be included in the pixel PX1. In the case where the maximum storage capacity of the first storage transistor S1 is much larger than the storage capacity of the first floating diffusion node FDA, the first transfer transistor T1 may not be included in the pixel PX1. In the case where the first and second storage transistors S1 and S2 have very large storage capacities, it may be possible to prevent an overflow issue from occurring by a high intensity external light, even when at least one or all of the first to fourth transfer transistors T1-T4 are omitted. In this case, a size of the pixel PX1 may be reduced.

In some embodiments, in the case where the first and second photo gate signals PG1 and PG2 in the low-level state are applied to the first and second photo gate transistors P1 and P2, respectively, electric charges may be transferred from the first and second photo gate transistors P1 and P2 to the first and second storage transistors S1 and S2. Under such a condition, the second and fourth transfer transistors T2 and T4 may be omitted from the pixel PX1.

The first read circuit RC1 may be configured to produce a first image signal VOA, based on electric charges stored in the first floating diffusion node FDA. The second read circuit RC2 may be configured to produce a second image signal VOB, based on electric charges stored in the second floating diffusion node FDB. The first read circuit RC1 may include a first reset transistor R1, a first source follower transistor SF1, and a first selection transistor SE1. The second read circuit RC2 may include a second reset transistor R2, a second source follower transistor SF2, and a second selection transistor SE2. The second read circuit RC2 may be configured to have substantially the same structure as the first read circuit RC1 and thus, a detailed description thereof will be omitted.

The first reset transistor R1 may be configured to remove electric charges from the first floating diffusion node FDA, in response to a reset control signal RG. For example, a reset operation, based on the reset control signal RG in the high-level state, may be performed before the sensing period, before the operation of transferring electric charges from the first storage transistor S1 to the first floating diffusion node FDA, and after the operation of reading the first image signal VOA. The first reset transistor R1 may be connected between a terminal, to which a first driving voltage VDD1 is supplied, and the first floating diffusion node FDA.

The first source follower transistor SF1 may be configured to produce the first image signal VOA, based on an amount of the electric charges stored in the first floating diffusion node FDA. The magnitude of the first image signal VOA may be determined by an amount of the electric charges stored in the first floating diffusion node FDA. The first source follower transistor SF1 may be connected between a terminal, to which a second driving voltage VDD2 is supplied, and the first selection transistor SE1.

The first selection transistor SE1 may output the first image signal VOA in response to a selection signal SEL. The first selection transistor SE1 may output the first image signal VOA to a bit line, which is connected to the pixel PX1, in response to the selection signal SEL in a high-level state. The first selection transistor SE1 may output signals, which are produced by the first floating diffusion node FDA in the reset state, and the first image signal VOA to allow the CDS 123 of FIG. 1 to perform a correlated double sampling operation.

Unlike the structure shown in FIG. 2, in some embodiments, the pixel PX1 may be configured to have one read circuit. For example, the second read circuit RC2 may be omitted, and the third transfer transistor T3 may be connected to the first floating diffusion node FDA, instead of the second read circuit RC2. In other words, electric charges stored in the first and second storage transistors S1 and S2 may be transferred to a shared floating diffusion node. In this case, it may be possible to reduce the size of the pixel PX1.

Furthermore, the first read circuit RC1 or the second read circuit RC2 may be configured to receive electric charges from a neighboring pixel. For example, the first floating diffusion node FDA may be configured to receive electric charges not only from the first storage transistor S1 and but also from the storage transistor of the neighboring pixel. In other words, at least two pixels, which are arranged adjacent to each other, may be configured to share a single floating diffusion node. In this case, it may be possible to reduce the size of the pixel array 121.

The anti-blooming transistor AB may be configured to discharge electric charges from the pixel PX1, in response to an anti-blooming control signal ABG. Owing to external light to be incident to the pixel PX1 after the sensing period, additional charges may be collected in the charge collection circuit CC. In the case where the external light to be incident into the pixel PX1 has a high intensity, electric charges may be collected to the charge collection circuit CC, even when the charge collection circuit CC is turned off. In some embodiments, the anti-blooming control signal ABG in a high-level state may be applied to the anti-blooming transistor AB to discharge such electric charges from the charge collection circuit CC after the sensing period. The anti-blooming transistor AB may be connected between the charge collection circuit CC and a terminal, to which the first driving voltage VDD1 is supplied.

Figure 3:
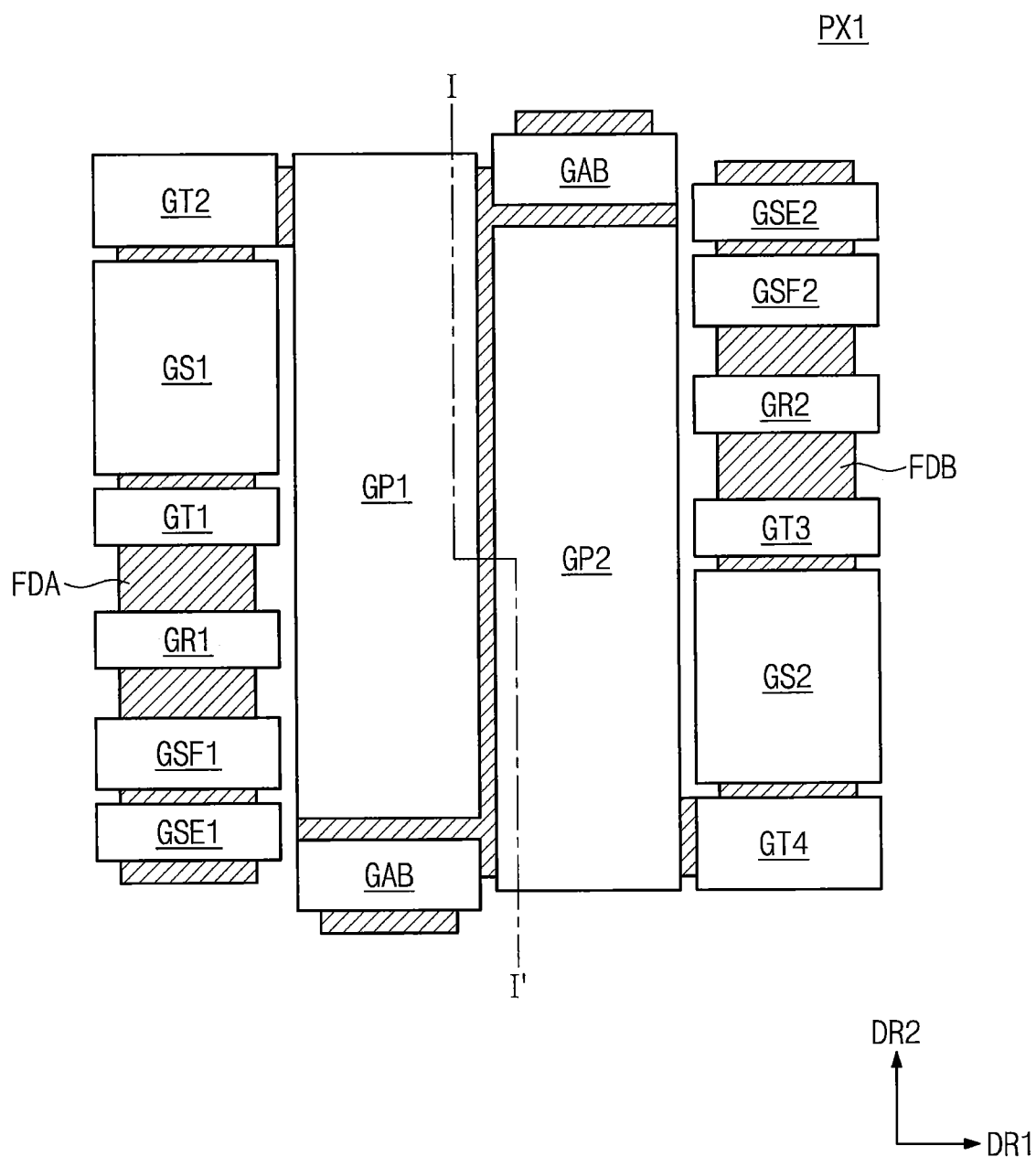
FIG. 3 is a layout of the pixel of FIG. 2 according to some embodiments of the inventive concept.

FIG. 3 is a layout of the pixel of FIG. 2 according to some embodiments of the inventive concept. Referring to FIG. 3, the pixel PX1 may include gate electrodes GP1 and GP2 of the first and second photo gate transistors P1 and P2, gate electrodes GT1, GT2, GT3, GT4 of the first to fourth transfer transistors T1, T2, T3, and T4, gate electrodes GS1 and GS2 of the first and second storage transistors S1 and S2, gate electrodes GR1 and GR2 of the first and second reset transistors R1 and R2, gate electrodes GSF1 and GSF2 of the first and second source follower transistors SF1 and SF2, gate electrodes GSE1 and GSE2 of the first and second selection gate transistors SE1 and SE2, and a gate electrode GAB of the anti-blooming transistor AB.

Although an example of the layout of the pixel PX1 is illustrated in FIG. 3, the structure of the pixel PX1 is not limited to that shown in FIG. 3. For concise description, an element previously described with reference to FIG. 2 may be identified by the same reference number. Hereinafter, a first direction DR1 and a second direction DR2 shown in FIG. 3 may be defined to be perpendicular to a light-receiving direction. The first direction DR1 and the second direction DR2 may be defined to be perpendicular to each other. In some embodiments, both the first direction DR1 and the second direction DR2 are horizontal directions that are parallel to opposing surfaces of a substrate (e.g., a first substrate region 11 in FIG. 4).

In FIG. 3, hatched regions may represent source and drain regions of each of the transistors of FIG. 3. For example, the hatched regions, which are illustrated adjacent to the gate electrode GT1 of the first transfer transistor T1 in the second direction DR2, may depict the source and drain regions, respectively, of the first transfer transistor T1. However, each of the first and second photo gate transistors P1 and P2 may have a different structure from other transistors, as will be described with reference to FIGS. 4 and 5.

The gate electrodes GP1 and GP2 of the first and second photo gate transistors P1 and P2 may be placed at or near a center region of the pixel PX1. An area of each of the gate electrodes GP1 and GP2 of the first and second photo gate transistors P1 and P2 may be large enough to effectively collect electric charges, which are produced by (e.g., generated in response to) an incident light. For example, the gate electrodes GP1 and GP2 of the first and second photo gate transistors P1 and P2 may be provided to have an area that is larger than other gate electrodes included in the pixel PX1. The gate electrode GP1 of the first photo gate transistor P1 may be placed adjacent to the gate electrode GP2 of the second photo gate transistor P2 in the first direction DR1. In some embodiments, the gate electrode GP1 and the gate electrode GP2 are spaced apart from each other in the first direction DR1 as illustrated in FIG. 3.

The gate electrode GS1 of the first storage transistor S1 may be placed adjacent to the first photo gate transistor P1 in the first direction DR1. The gate electrode GS1 of the first storage transistor S1 may be placed between the gate electrode GT1 of the first transfer transistor T1 and the gate electrode GS2 of the second transfer transistor T2 in the second direction DR2. The gate electrode GS1 of the first storage transistor S1 may have an area that is large enough to sufficiently store the first charges. For example, the gate electrode GS1 of the first storage transistor S1 may be provided to have a next largest gate area (i.e., smaller than only the gate electrodes of the first and second photo gate transistors P1 and P2).

The gate electrode GS2 of the second storage transistor S2 may be placed adjacent to the second photo gate transistor P2 in the first direction DR1. The gate electrode GS2 of the second storage transistor S2 may be placed between the gate electrode GT3 of the third transfer transistor T3 and the gate electrode GT4 of the fourth transfer transistor T4, in the second direction DR2. Similar to the first storage transistor S1, the gate electrode GS2 of the second storage transistor S2 may have an area that is large enough to sufficiently store the second charges.

In some embodiments, at least one of the first to fourth transfer transistors T1-T4 may be omitted from the pixel PX1. In this case, the gate electrodes GS1 and GS2 of the first and second storage transistors S1 and S2 may be provided to have an increased area or width. In some embodiments, the pixel PX1 may be provided to have a reduced area.

The gate electrode GR1 of the first reset transistor R1, the gate electrode GSF1 of the first source follower transistor SF1, and the gate electrode GSE1 of the first selection transistor SE1 may be arranged in the second direction DR2 to form the first read circuit RC1. The first selection transistor SE1 may be connected to the bit line. Although not shown in FIG. 3, the structure of the first read circuit RC1 of FIG. 2 may be provided to have a trench, which is formed in a hatched region between the gate electrode GR1 of the first reset transistor R1 and the gate electrode GSF1 of the first source follower transistor SF1, and in this case, a line may be provided to connect the first floating diffusion node FDA to the gate electrode GSF1 of the first source follower transistor SF1.

The first floating diffusion node FDA may be provided between the first transfer transistor T1 and the first read circuit RC1, in the second direction DR2. When viewed in a plan view, the first floating diffusion node FDA may be formed to have an area less than that of the gate electrode GS1 of the first storage transistor S1 and to have a storage capacity less than that of the first storage transistor S1. By controlling a voltage level of the storage control signal SG, it may be possible to transfer electric charges, which are stored in the first storage transistor S1, to the first floating diffusion node FDA in a sequentially divided manner (e.g., through several outputting steps), and this may allow for the above difference in area between the first floating diffusion node FDA and the gate electrode GS1 of the first storage transistor S1.

The gate electrode GR2 of the second reset transistor R2, the gate electrode GSF2 of the second source follower transistor SF2, and the gate electrode GSE2 of the second selection transistor may be arranged in the second direction DR2 to form the second read circuit RC2. The second selection transistor SE2 may be connected to the bit line. The first selection transistor SE1 and the second selection transistor SE2 may be connected to different bit lines, but the inventive concept is not limited thereto. For example, the first selection transistor SE1 and the second selection transistor SE2 may be connected to the same bit line.

The gate electrode GAB of the anti-blooming transistor AB may be placed adjacent to the gate electrode GP1 or GP2 of the first or second photo gate transistors P1 or P2, in the second direction DR2. The anti-blooming transistor AB may be connected to a line, to which the first driving voltage VDD1 is supplied. After the sensing period, electric charges collected in the first and second photo gate transistors P1 and P2 may be discharged to the outside through the anti-blooming transistor AB.

Figure 4:
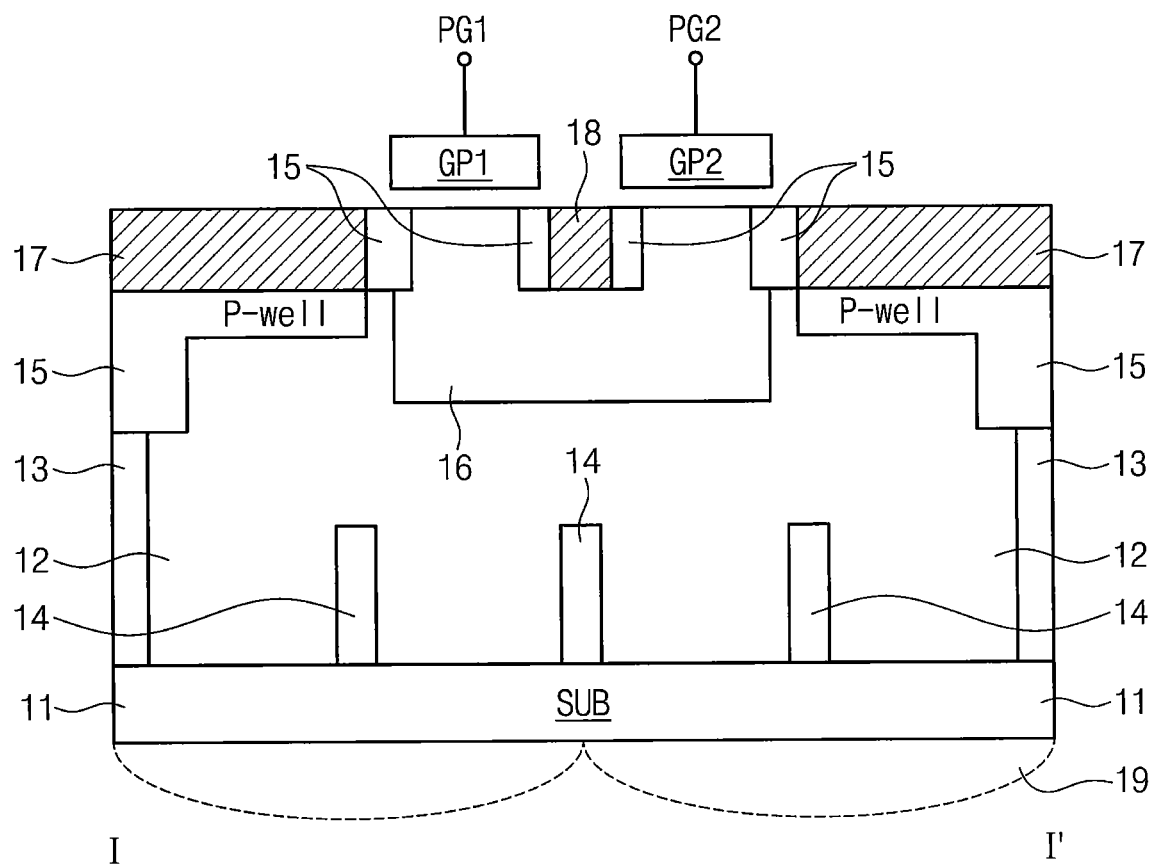
FIG. 4 is a cross-sectional view of a pixel, taken along line I-I' of FIG. 3, according to some embodiments of the inventive concept.
Figure 4:
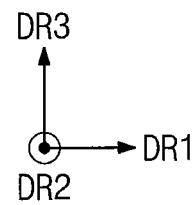

FIG. 4 is a cross-sectional view of a pixel taken along line I-I' of FIG. 3 according to some embodiments of the inventive concept. FIG. 4 illustrates a cross-sectional structure of the pixel of FIG. 3, seen in the second direction DR2. A pixel PX1a may include a first substrate region 11, a second substrate region 12, a first deep trench isolation (DTI) region 13, a second DTI region 14, a charge transport interruption region 15, a light detection region 16, an STI region 17, a channel interruption region 18, and gate electrodes GP1 and GP2 (hereinafter, first and second gate electrodes) of the first and second photo gate transistors P1 and P2. A third direction DR3 may be used to represent a light-receiving direction and may be defined to be perpendicular to both of the first and second directions DR1 and DR2. In some embodiments, as illustrated in FIG. 4, the first substrate region 11, the second substrate region 12, and the gate electrodes GP1 and GP2 are stacked in the third direction DR3 (i.e., a vertical direction), and both the first and second directions DR1 and DR2 are horizontal directions that are perpendicular to the third direction DR3.

In order to provide better understanding of the inventive concept, a width, in the first direction DR1, of each element shown in FIG. 4 may be slightly exaggerated. For example, referring back to the layout of FIG. 3, the STI region 17 may be provided to have a slightly small width in the first direction DR1, and the first and second gate electrodes GP1 and GP2 may be provided to have large widths in the first direction DR1, compared with the cross-sectional view of FIG. 4.

The first substrate region 11 may be used to receive light. In other words, the pixel PX1a may have a back-side illumination (BSI) structure of receiving light through a bottom surface thereof. The first substrate region 11 may be a silicon wafer or a transparent layer, which has a planarized or flat bottom surface, but the inventive concept is not limited thereto. The second substrate region 12 may be provided on the first substrate region 11 in the third direction DR3. The second substrate region 12 may be, for example, a p-type epitaxial layer, but the inventive concept is not limited thereto.

The first DTI region 13 may be configured to block (e.g., partially block, entirely block) an incident light or the consequent electric charges from entering a neighboring pixel, and, in some embodiments, the first DTI region 13 may be configured to prevent an incident light or the consequent electric charges from entering a neighboring pixel. The first DTI region 13 may be formed along an edge of the pixel PX1 of FIG. 3 or along edges of the first and second photo gate transistors P1 and P2. The first DTI region 13 may be extended in the third direction DR3 to be in contact with the STI region 17, and this may make it possible to block (e.g., partially block, entirely block) or prevent electric charges from entering a neighboring pixel. In some embodiments, as shown in FIG. 4, the charge transport interruption region 15 may be formed between the first DTI region 13 and the STI region 17, and the first DTI region 13 may be extended in the third direction DR3 to be in contact with the charge transport interruption region 15. The first DTI region 13 may be provided to isolate the second substrate region 12. The first DTI region 13 may be formed of or include oxide or poly silicon, but the inventive concept is not limited thereto.

The second DTI region 14 may be configured to cause scattering of an incident light and thereto to increase a length of a propagation path of the incident light. The presence of the second DTI region 14 may contribute to an increase in absorptivity of the incident light. The second DTI region 14 may be formed on the first substrate region 11 and may be extended in the third direction DR3. In some embodiments, a plurality of the second DTI regions 14 may be formed in a region provided with the first and second photo gate transistors P1 and P2. Electric charges produced by an incident light may be transferred through the second substrate region 12, and such electric charges may be guided by the first and second DTI regions 13 and 14 to be collected in the light detection region 16. In this case, the second substrate region 12 may be provided to have a reduced thickness in the third direction DR3. The thinner the second substrate region 12, the more quickly the electric charges produced by the incident light are collected, and thus, the thinning of the second substrate region 12 may allow for a fast switch operation of the first and second gate electrodes GP1 and GP2. The second DTI region 14 may be formed of or include at least one of oxide, dielectric materials, or metallic materials, but the inventive concept is not limited thereto.

The charge transport interruption region 15 may be provided to allow electric charges to be transferred into the light detection region 16. The charge transport interruption region 15 may be a p-well region, but the inventive concept is not limited thereto. The charge transport interruption region 15 may be provided between the STI region 17 and the second substrate region 12. In certain embodiments, the charge transport interruption region 15 may be further provided between the STI region 17 and the light detection region 16 and between the channel interruption region 18 and the light detection region 16.

The light detection region 16 may be configured to collect electric charges and to transfer the electric charges to the first and second storage transistors S1 and S2, depending on levels of voltages applied to the first and second gate electrodes GP1 and GP2. The light detection region 16 may be doped with p-type impurities, but the inventive concept is not limited thereto. An upper portion of the light detection region 16, which is located below the first and second gate electrodes GP1 and GP2, may be divided into two regions, which are spaced apart from each other in the first direction DR1, by the channel interruption region 18.

In the case where the first photo gate signal PG1 in the high-level state is applied to the first gate electrode GP1, electric charges may be collected in the light detection region 16 adjacent to the first gate electrode GP1. Thereafter, in the case where the first photo gate signal PG1 in the low-level state is applied to the first gate electrode GP1, the electric charges collected in the light detection region 16 adjacent to the first gate electrode GP1 may be stored in the first storage transistor S1 of FIG. 2. Here, owing to the channel interruption region 18, the collected charges may not be moved to the light detection region 16 adjacent to the second gate electrode GP2.

In the case where the second photo gate signal PG2 in the high-level state is applied to the second gate electrode GP2, electric charges may be collected in the light detection region 16 adjacent to the second gate electrode GP2. During the sensing period, the first and second photo gate signals PG1 and PG2 may have phases opposite to each other. Thereafter, in the case where the second photo gate signal PG2 in the low-level state is applied to the second gate electrode GP2, the electric charges collected in the light detection region 16 adjacent to the second gate electrode GP2 may be stored in the second storage transistor S2 of FIG. 2. Here, owing to the channel interruption region 18, the collected charges may not be moved to the light detection region 16 adjacent to the first gate electrode GP1.

The STI region 17 may be provided on the charge transport interruption region 15 and may be formed of an insulating material.

The channel interruption region 18 may be formed of or include the same material as the STI region 17. The channel interruption region 18 may be configured to allow electric charges to be distinctively collected in the first and second photo gate transistors P1 and P2. That is, the channel interruption region 18 may allow electric charges to be transferred in the first direction DR1 and along clearly distinct paths. The channel interruption region 18 may be formed in the hatched region of FIG. 3 (e.g., between the gate electrode GP1 of the first photo gate transistor P1 and the gate electrode GP2 of the second photo gate transistor P2). The channel interruption region 18 may be doped with p-type impurities.

A micro lens 19 may be provided below the pixel PX1a. The micro lens 19 may be provided adjacent to the first substrate region 11 in the third direction DR3. The micro lens 19 may be configured to concentrate light to be incident into the first substrate region 11 and the second substrate region 12.

Figure 5:
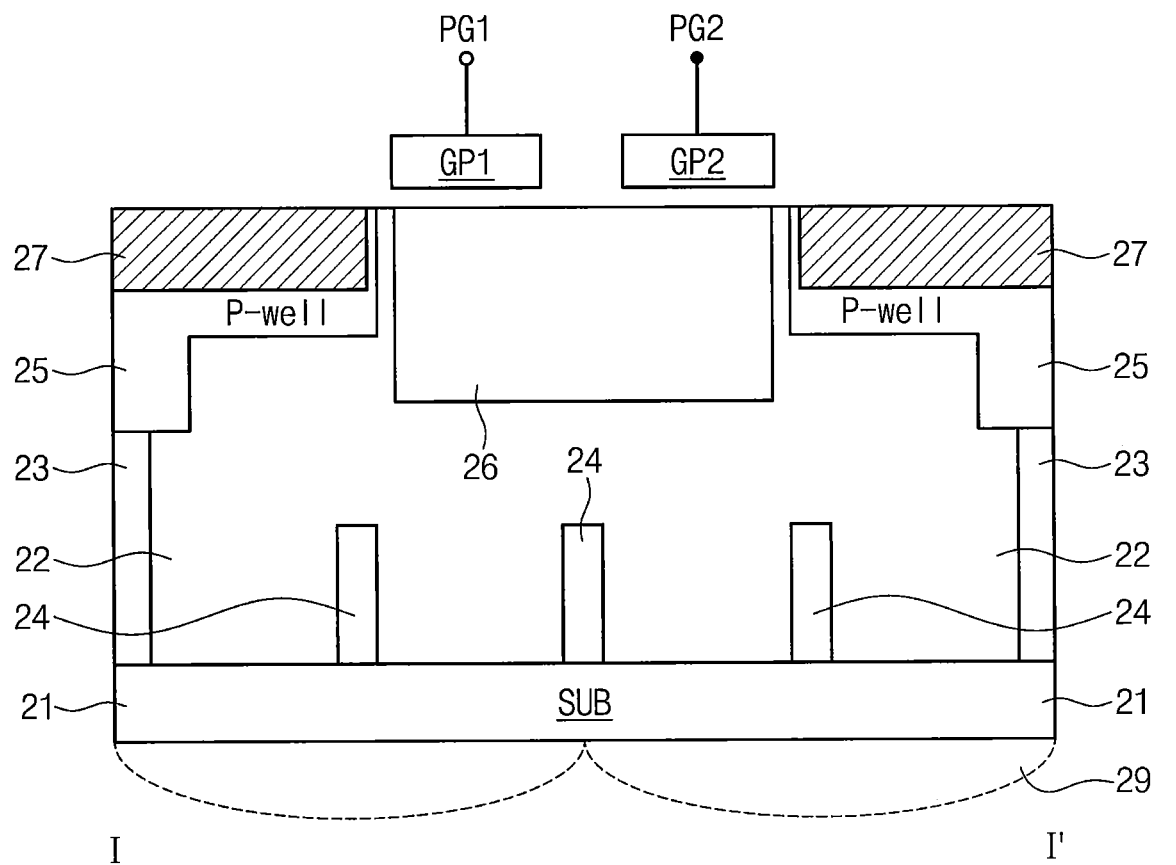
FIG. 5 is a cross-sectional view of a pixel, taken along line I-I' of FIG. 3, according to some embodiments of the inventive concept.

FIG. 5 is a cross-sectional view of a pixel, taken along line I-I' of FIG. 3 according to some embodiments of the inventive concept. FIG. 5 illustrates a cross-sectional structure of the pixel of FIG. 3, seen in the second direction DR2. A pixel PX1b may include a first substrate region 21, a second substrate region 22, a first DTI region 23, a second DTI region 24, a charge transport interruption region 25, a light detection region 26, an STI region 27, and the first and second gate electrodes GP1 and GP2. A micro lens 29 may be provided below the pixel PX1b. The pixel PX1b may be provided to have the BSI structure. The remaining elements of the pixel PX1b, except for the light detection region 26, may have substantially the same structures as those of FIG. 4.

Compared with the structure of FIG. 4, the channel interruption region 18 of the pixel PX1a may be omitted from the pixel PX1b. In the case where, unlike the structure shown in FIG. 4, a high-level voltage is applied to the first or second gate electrode GP1 or GP2 of FIG. 5, the pixel PX1b may transfer the electric charges to the first or second storage transistor S1 or S2 while collecting electric charges in the light detection region 26. In the pixel PX1a of FIG. 4, the electric charges may be transferred to the first or second storage transistor S1 and S2 only when a low-level voltage is applied to the first or second gate electrode GP1 or GP2. That is, in the case where a high-level voltage is applied to the first or second gate electrode GP1 or GP2 of FIG. 4, the pixel PX1a may collect electric charges in the light detection region 16 while blocking (e.g., partially blocking, entirely blocking) or preventing the electric charges from being transferred to the first or second storage transistor S1 or S2.

In detail, the first and second photo gate signals PG1 and PG2 may have phases opposite to each other. In the case where a high-level voltage is applied to the first gate electrode GP1 and a low-level voltage is applied to the second gate electrode GP2, electric charges may be collected in the light detection region 26 adjacent to the first gate electrode GP1 and may be transferred to the first storage transistor S1. Since a voltage level of the light detection region 26 adjacent to the first gate electrode GP1 is higher than that of the light detection region 26 adjacent to the second gate electrode GP2, it may be possible to prevent, block (e.g., partially block, entirely block), or suppress the electric charges from being transferred toward the second gate electrode GP2.

By contrast, in the case where the low-level voltage is applied to the first gate electrode GP1 and the high-level voltage is applied to the second gate electrode GP2, electric charges may be collected in the light detection region 26 adjacent to the second gate electrode GP2 and may be transferred to the second storage transistor S2. Since a voltage level of the light detection region 26 adjacent to the second gate electrode GP2 is higher than that of the light detection region 26 adjacent to the first gate electrode GP1, it may be possible to prevent, block (e.g., partially block, entirely block), or suppress the electric charges from being transferred toward the first gate electrode GP1. According to the pixel PX1b shown in FIG. 5, since there is no channel interruption region (e.g., channel interruption region 18 in FIG. 4), the electric charges may be more effectively transferred in the third direction DR3.

Figure 6:
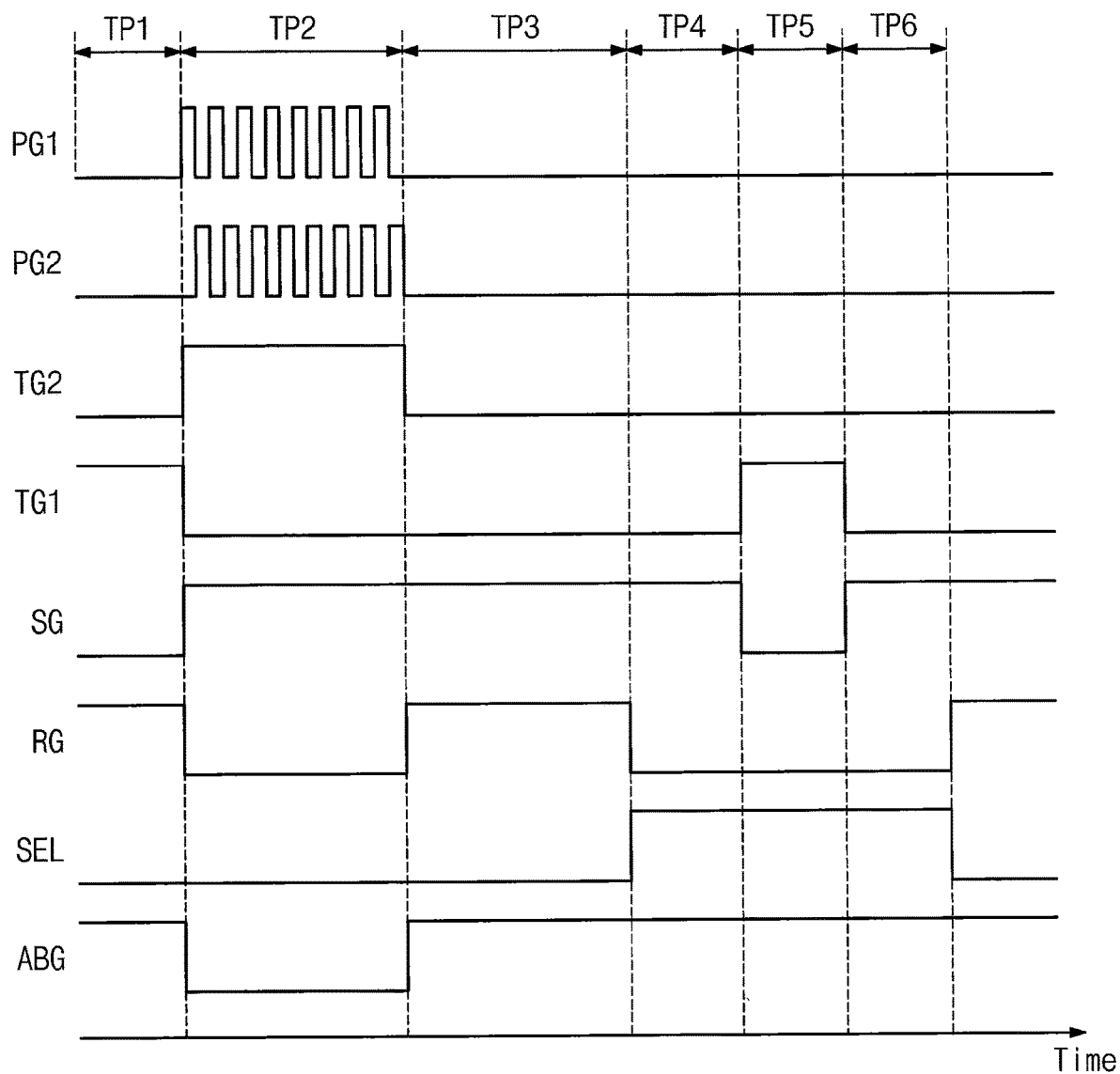
FIG. 6 is a timing diagram for the pixel of FIG. 2 according to some embodiments of the inventive concept.

FIG. 6 is a timing diagram for the pixel of FIG. 2 according to some embodiments of the inventive concept. In FIG. 6, the horizontal axis represents time, and the vertical axis represent magnitudes of the first and second photo gate signals PG1 and PG2, the first and second transfer control signals TG1 and TG2, the storage control signal SG, the reset control signal RG, the selection signal SEL, and the anti-blooming control signal ABG of FIG. 2. The first and second photo gate signals PG1 and PG2, the first and second transfer control signals TG1 and TG2, the storage control signal SG, the reset control signal RG, the selection signal SEL, and the anti-blooming control signal ABG may be generated in the row decoder 122 of FIG. 1. In the following description of FIG. 6, an element previously described with reference to FIG. 2 may be identified by the same reference number.

A first period TP1 may be referred to as a global reset period. During the global reset period, electric charges, which are stored in the first and second floating diffusion nodes FDA and FDB (hereinafter, the floating diffusion regions), the first and second storage transistors S1 and S2, and the charge collection circuit CC of the pixel PX1, may be discharged. During the global reset period, the electric charges may be discharged from the pixels included in the pixel array 121 of FIG. 1. To do this, each of the reset control signal RG, the first transfer control signal TG1, and the anti-blooming control signal ABG may have a high level.

A second period TP2 may be referred to as a sensing period. During the sensing period, the light source 112 of FIG. 1 may output an irradiation light to the outside, and the pixel PX1 may be used to sense a fraction of the irradiation light, which is reflected by a subject, and to collect the consequent electric charges. Furthermore, the collected charges may be stored in the first storage transistor S1 or the second storage transistor S2. The irradiation light may be emitted to the outside in response to a first clock signal. The first clock signal may be the same as the first photo gate signal PG1. However, the inventive concept is not limited thereto, and the first clock signal may have a specific phase difference with respect to the first photo gate signal PG1. The first and second photo gate signals PG1 and PG2 may be toggled, while maintaining phases opposite to each other.

When the first photo gate signal PG1 is in a high-level state, the electric charges may be collected in the first photo gate transistor P1. When the second photo gate signal PG2 has a high-level state, the electric charges may be collected in the second photo gate transistor P2. In the pixel PX1a shown in FIG. 4, when the first photo gate signal PG1 is in a low-level state, the electric charges may be transferred to the first storage transistor S1 through the second transfer transistor T2. In the pixel PX1a shown in FIG. 4, when the second photo gate signal PG2 is in a low-level state, the electric charges may be transferred to the second storage transistor S2 through the fourth transfer transistor T4. In the pixel PX1b shown in FIG. 5, when the first photo gate signal PG1 is in a high-level state, the electric charges may be transferred to the first storage transistor S1 through the second transfer transistor T2. In the pixel PX1b shown in FIG. 5, when the second photo gate signal PG2 is in a high-level state, the electric charges may be transferred to the second storage transistor S2 through the fourth transfer transistor T4.

If the second transfer control signal TG2 is in a high-level state, the second and fourth transfer transistors T2 and T4 may be turned on to allow the electric charges to be stored in first and second storage transistors S1 and S2 (hereinafter, storage units). If the first transfer control signal TG1 is in a low-level state, the first and third transfer transistors T1 and T3 may be turned off to block (e.g., partially block, entirely block) or prevent the electric charges, which are stored in the storage units S1 and S2, from being transferred to the floating diffusion regions FDA and FDB. If the storage control signal SG is in a high-level state, each of the storage units S1 and S2 may have an increased storage capacity.

A third period TP3 may be referred to as a row reset period. During the row reset period, the electric charges, which are stored in the floating diffusion regions FDA and FDB and the charge collection circuit CC of the pixel PX1, may be discharged. For example, the electric charges may be discharged from pixels in a row selected by the row decoder 122 of FIG. 1 during the row reset period. To do this, each of the reset control signal RG and the anti-blooming control signal ABG may have a high level.

A fourth period TP4 may be referred to as a read period of the reset signal. During the read period of the reset signal, reset signals, which are produced based on the floating diffusion regions FDA and FDB in the reset state, may be output to the bit line. To do this, the selection signal SEL may have a high level, and reset signals, which are produced by the first and second source follower transistors SF1 and SF2, may be output to the bit line. The reset signal, along with an image signal to be read in a subsequent step, may be used for the correlated double sampling operation in the CDS 123 of FIG. 1.

A fifth period TP5 may be referred to as a transfer period. During the transfer period, the first storage charges stored in the first storage transistor S1 may be transferred to the first floating diffusion node FDA. The second storage charges stored in the second storage transistor S2 may be transferred to the second floating diffusion node FDB. To transfer the first storage charges to the first floating diffusion node FDA and transfer the second storage charges to the second floating diffusion node FDB, the first transfer control signal TG1 may have a high level and the first and third transfer transistors T1 and T3 may be turned on.

During the fifth period TP5, the storage control signal SG may have a low level. In this case, the first and second storage charges, which are respectively stored in the storage units S1 and S2, may be transferred to the floating diffusion regions FDA and FDB. However, during the fifth period TP5, a voltage level of the storage control signal SG may be controlled to allow the first and second storage charges to be partly output from the storage units S1 and S2, respectively.

In some embodiments, unlike that shown in FIG. 6, the storage control signal SG may have a middle level between the low level and the high level, during the fifth period TP5. In some embodiments, the storage control signal SG may have a magnitude that is greater than a magnitude of the low level and less than a magnitude of the high level. In this case, a storage capacity of each of the storage units S1 and S2 may be smaller than that in the fourth period TP4. However, since, during the fifth period TP5, the storage units S1 and S2 have a certain level of storage capacity, all of the first and second storage charges may not be transferred to the first and second floating diffusion node FDA and FDB. For example, some of the first storage charges may be transferred to the first floating diffusion node FDA. In the case where the storage capacities of the first and second floating diffusion nodes FDA and FDB are smaller than those of the storage units S1 and S2, the first and second storage charges may be transferred to the first and second floating diffusion nodes FDA and FDB in a sequentially divided manner (e.g., through several outputting steps).

A sixth period TP6 may be referred to as a read period of the image signal. During the read period of the image signal, image signals, which are produced by the electric charges transferred to the floating diffusion regions FDA and FDB, may be output to the bit line. To do this, the selection signal SEL may have a high level, and image signals, which are produced by the first and second source follower transistors SF1 and SF2, may be output to the bit line.

After the sixth period TP6, the row reset period, such as the third period TP3, may be executed. In this case, electric charges accumulated in the floating diffusion regions FDA and FDB may be discharged. Next, the read period of the reset signal, such as the fourth period TP4, may be executed, and then, the transfer period, such as the fifth period TP5, may be executed. During the re-executed transfer period (e.g., a second transfer period), a voltage level of the storage control signal SG may be lower than a voltage level of the storage control signal SG in the fifth period TP5 (e.g., a first transfer period). For example, the storage control signal SG in the fifth period TP5 (e.g., the first transfer period) may have a middle level, and the storage control signal SG in a subsequent transfer period (e.g., the second transfer period) may have a low level that is lower than the middle level.

As described above, the storage control signal SG may be used to output the first and second storage charges to the floating diffusion regions FDA and FDB in the sequentially divided manner. For each step of transmitting the first and second storage charges, the third to sixth periods TP3-TP6 can be repeated, and the voltage level of the storage control signal SG at the fifth period TP5 is monotonically and/or gradually lowered during the repetition of the transmitting of the first and second storage charges. In this case, the floating diffusion regions FDA and FDB may be allowed to have a small storage capacity. If the floating diffusion regions FDA and FDB has a reduced storage capacity, it may be possible to increase a conversion gain of an image signal, which is obtained by the first and second source follower transistors SF1 and SF2, and to reduce a quantization error in a signal conversion process.

In the case where the first and second storage charges are transferred to the floating diffusion regions FDA and FDB in the sequentially divided manner, it may be possible to shorten the second period TP2 or the sensing period. For example, an intensity of the irradiation light may be increased, and an output time of the irradiation light corresponding to the sensing period may be decreased. In this case, an intensity of the reflected fraction of the irradiation light per unit time may be increased, and an amount of electric charges stored in the storage units S1 and S2 may be increased. However, since the stored charges are output to the floating diffusion regions FDA and FDB through several output processes, it may be possible to prevent an overflow issue from occurring in the floating diffusion regions FDA and FDB. In addition, since the anti-blooming transistor AB is maintained to a turned-on state after the second period TP2, it may be possible to prevent an image signal from being affected by an additional external light and the consequent electric charges and to obtain a highly-reliable image signal. When the anti-blooming transistor AB is in the turned-on state, the voltage levels of the first and second photo gate signals PG1 and PG2 may be fixed to a low level or a high level.

FIGS. 7 to 10 are diagrams illustrating an operation of storing and transferring charges, in accordance with the timing diagram of FIG. 6, according to some embodiments of the inventive concept. In the following description of FIGS. 7 to 10, an element previously described with reference to FIG. 6 may be identified by the same reference number.

Figure 7:
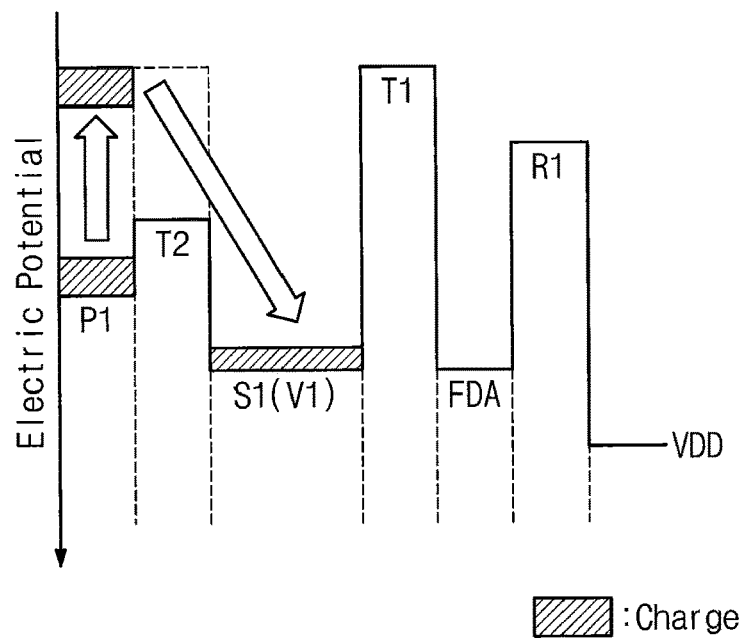
FIGS. 7 to 10 are diagrams illustrating an operation of storing and transferring charges, in accordance with the timing diagram of FIG. 6, according to some embodiments of the inventive concept.

FIG. 7 illustrates electric potentials of components (e.g., transistors), when the pixel is in the second period TP2 of FIG. 6. Referring to FIG. 7, the first photo gate signal PG1 may be toggled, during the second period TP2. When the first photo gate signal PG1 is in the high-level state, the first photo gate transistor P1 may be used to collect electric charges, and when the first photo gate signal PG1 is in the low-level state, the first photo gate transistor P1 may be used to transfer the electric charges to the first storage transistor S1 through the second transfer transistor T2. The transferred electric charges may be stored in the first storage transistor S1. The first storage transistor S1 may have a storage capacity that is determined by the storage control signal SG of a high level V1.

Figure 8:
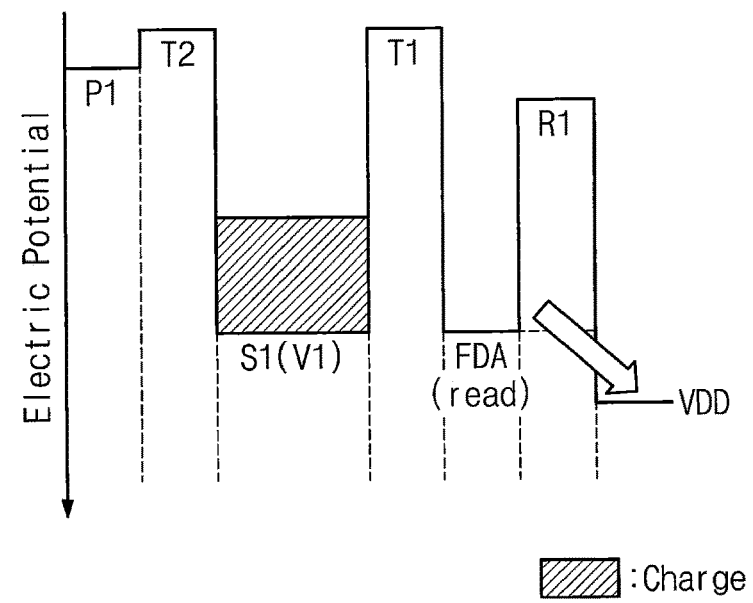

FIG. 8 illustrates electric potentials of components, when the pixel is in the third and fourth periods TP3 and TP4 of FIG. 6. Referring to FIG. 8, during the second period TP2, electric charges may be stored in the first storage transistor S1. During the third period TP3, the second transfer control signal TG2 may be in the low-level state, and in this case, electric charges stored in the first storage transistor S1 may not be transferred to the second transfer transistor T2 and, in some embodiments, electric charges stored in the first storage transistor S1 may be prevented from being transferred to the second transfer transistor T2. Furthermore, the reset control signal RG in the high-level state may be applied to turn on the first reset transistor R1 and thereby to reset the first floating diffusion node FDA. A reset signal may be produced, based on the first floating diffusion node FDA which is reset during the fourth period TP4, and then may be output to the bit line. In FIG. 8, the first transfer transistor T1 is illustrated to be turned off, after the second period TP2, but the inventive concept is not limited thereto. For example, the first transfer transistor TP1 may be turned on, after the second period TP2.

Figure 9:
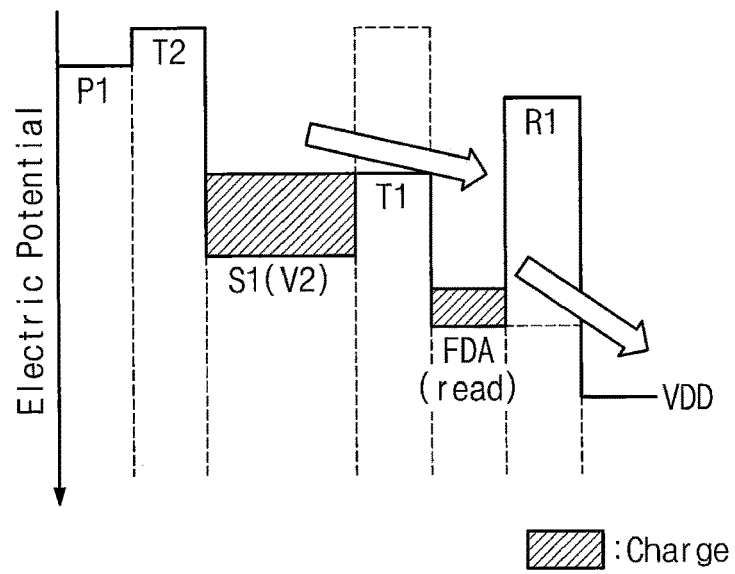

FIG. 9 illustrates electric potentials of components, when the pixel is in the fifth and sixth periods TP5 and TP6 of FIG. 6. Referring to FIG. 9, during the fifth period TP5, the storage control signal SG may have a middle level V2, allowing the first storage transistor S1 to have a reduced storage capacity. The middle level V2 of the storage control signal SG may be lower than the high level V1 of the storage control signal SG. The first transfer transistor T1 may be turned on by the first transfer control signal TG1 in a high-level state. Some of the electric charges stored in the first storage transistor S1 may be transferred to the first floating diffusion node FDA through the first transfer transistor T1. In the case where, unlike that shown in FIG. 9, the incident light has a low intensity, an amount of the electric charges stored in the first storage transistor S1 may be less than a storage capacity of the first storage transistor S1 in the fifth period TP5, and hence, there may be no electric charge to be transferred to the first floating diffusion node FDA during the fifth period TP5.

During the sixth period TP6, an image signal may be produced, based on the electric charges stored in the first floating diffusion node FDA, and then may be output to the bit line. After the sixth period TP6, the first reset transistor R1 may be turned on by the reset control signal RG in the high-level state. In this case, the electric charges stored in the first floating diffusion node FDA may be discharged.

Figure 10:
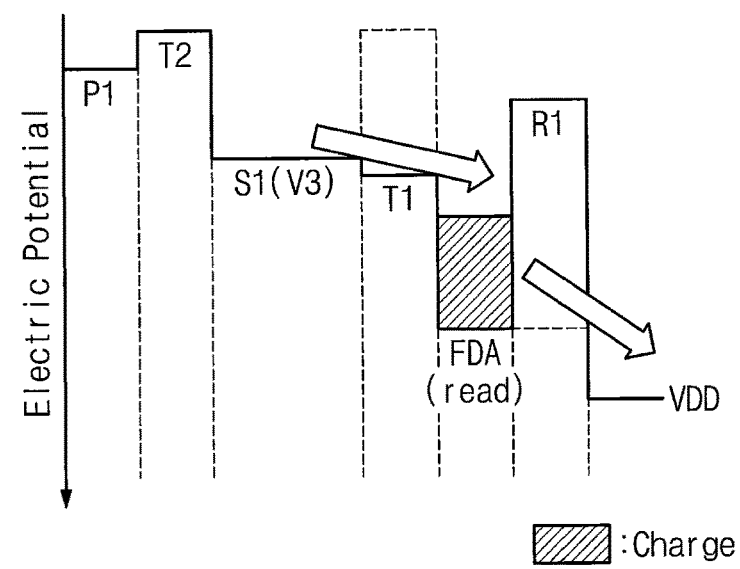

FIG. 10 illustrates electric potentials of components, when the third to sixth periods TP3 to TP6 are repeated, after the sixth period TP6 of FIG. 6. Referring to FIG. 10, after the resetting of the first floating diffusion node FDA, a reset signal may be produced, based on the first floating diffusion node FDA in the reset state, and then may be output to the bit line, similar to the fourth period TP4. Thereafter, the storage control signal SG may have a low level V3, allowing the first storage transistor S1 to have a reduced storage capacity. The low level V3 of the storage control signal SG may be lower than the middle level V2 of the storage control signal SG. At this time, the remaining electric charges stored in the first storage transistor S1 may be transferred to the first floating diffusion node FDA through the first transfer transistor T1. An image signal may be produced, based on the electric charges stored in the first floating diffusion node FDA, and then may be output to the bit line. Thereafter, the first reset transistor R1 may be turned on by the reset control signal RG in the high-level state, and the electric charges stored in the first floating diffusion node FDA may be discharged.

Referring to FIGS. 7 to 10, even when an incident light has a high intensity, it may be possible to obtain a reliable image signal and to reduce a quantization error, because the first storage transistor S1 is configured to transfer the electric charges in the sequentially divided manner (e.g., through several outputting steps). In the case where the incident light has a low intensity, the electric charges may be transferred only when the storage control signal SG has the low level V3. Thus, it may be possible to decrease a bit resolution of a signal, which is read when the storage control signal SG and the storage control signal SG have the high level V1 and the middle level V2, respectively.

Figure 11:
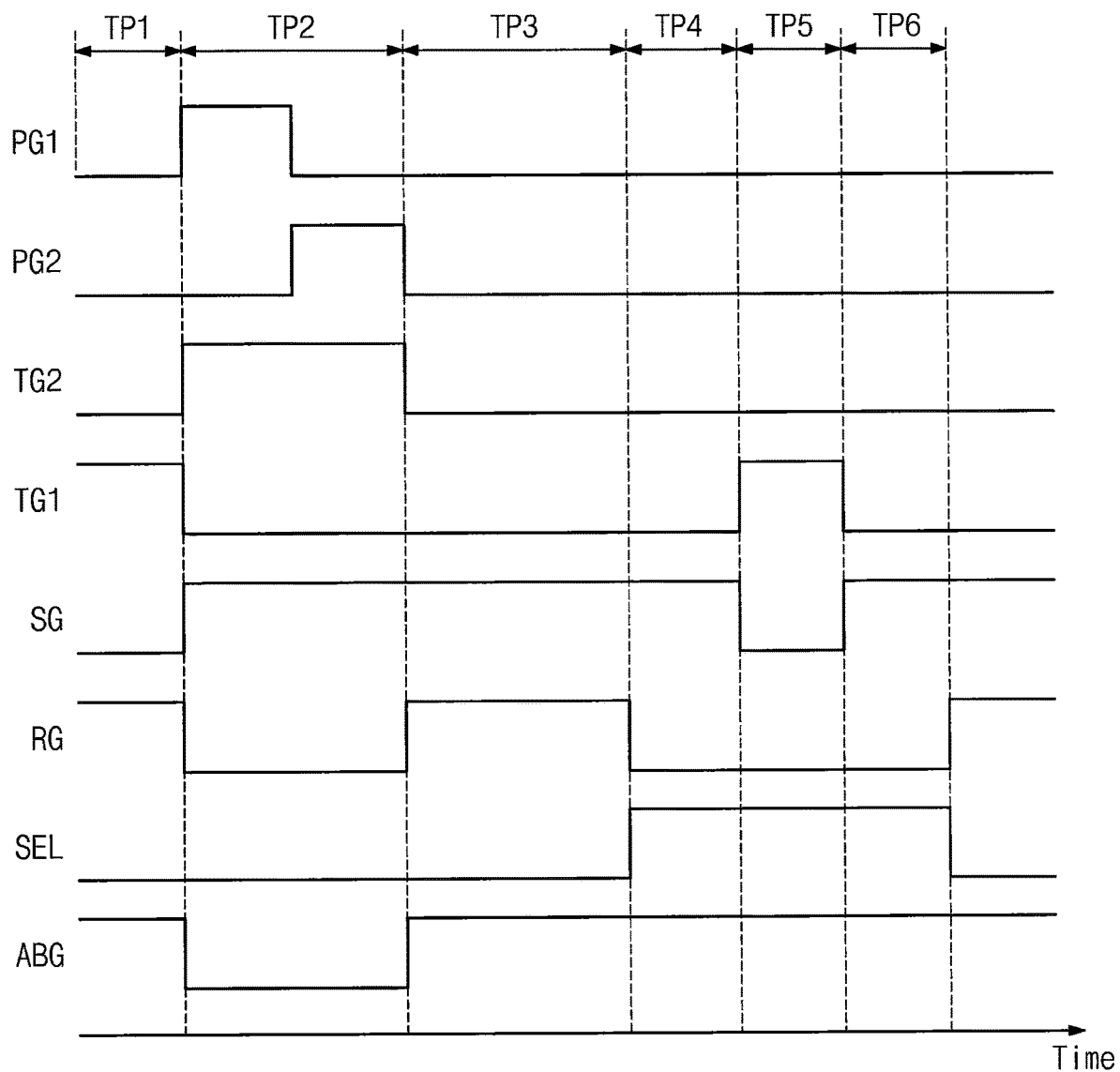
FIG. 11 is a timing diagram for the pixel of FIG. 2 according to some embodiments of the inventive concept.

FIG. 11 is a timing diagram for the pixel of FIG. 2 according to some embodiments of the inventive concept. In FIG. 11, the horizontal axis represents time, and the vertical axis represents magnitudes of signals to be applied to the pixel PX1 of FIG. 2. The remaining signals, except for the first and second photo gate signals PG1 and PG2, may have substantially the same waveform as those of FIG. 6, and for brevity's sake, a detailed description thereof will be omitted. Furthermore, for concise description, an element previously described with reference to FIG. 2 may be identified by the same reference number.

During the sensing period or the second period TP2, the first photo gate signal PG1 may be maintained to a high-level state and then may be maintained to a low-level state. By contrast, the second photo gate signal PG2 may be maintained to a low-level state and then may be maintained to a high-level state. When the first photo gate signal PG1 is in the high-level state, the light source 112 of FIG. 1 may emit an irradiation light to the outside. When the first photo gate signal PG1 is in the low-level state, the light source 112 may not emit the irradiation light. However, the inventive concept is not limited thereto, and the light source 112 may be configured to emit the irradiation light, when the second photo gate signal PG2 is in the high-level state.

Referring to FIG. 11, the image sensor 120 may be configured to obtain an image using a global shutter method. Unlike that shown in FIG. 6, in some embodiments, the first and second photo gate signals PG1 and PG2 may not be toggled. The first photo gate transistor P1 may be configured to collect first charges, which are produced by an external light and a reflected fraction of the irradiation light. The second photo gate transistor P2 may be configured to collect second charges, which are produced by the external light. In other words, a first image signal generated by the first charges may be an analog signal resulting from not only the reflected fraction of the irradiation light but also the external light, and a second image signal generated by the second charges may be an analog signal resulting from only the external light. A difference between the first image signal and the second image signal may be used to extract an image signal associated with the reflected fraction of the irradiation light. Since the first and second storage transistors S1 and S2 are configured to transfer the electric charges in the sequentially divided manner, the reliability of the image signal may not be deteriorated by a high intensity external light, and, in some embodiments, it may be possible to prevent the reliability of the image signal from being deteriorated by a high intensity external light.

Referring to FIG. 11, the irradiation light may have a specific pattern. For the sake of simplicity, the description that follows will refer to an example in which the specific pattern has a linear shape. In the case where a linear irradiation light is reflected by a three-dimensional subject, the reflected light sensed by the image sensor 120 may have a deformed or curved shape depending on the three-dimensional shape of the subject. As described above, in FIG. 11, an image signal may be extracted from the reflected fraction of the irradiation light, and light having a curved shape may be sensed by the pixel array 121. In the image detecting system 100, a difference in shape between the emitted light and the sensed light may be used to calculate a distance to the subject. In other words, referring to FIG. 6, a traveling time of the irradiation light may be used to calculate a distance to the subject (e.g., a distance between the subject and a component of the image detecting system), whereas in the embodiment of FIG. 11, spatial deformation of the irradiation light may be used to calculate a distance of the subject (e.g., a distance between the subject and a component of the image detecting system).

Figure 12:
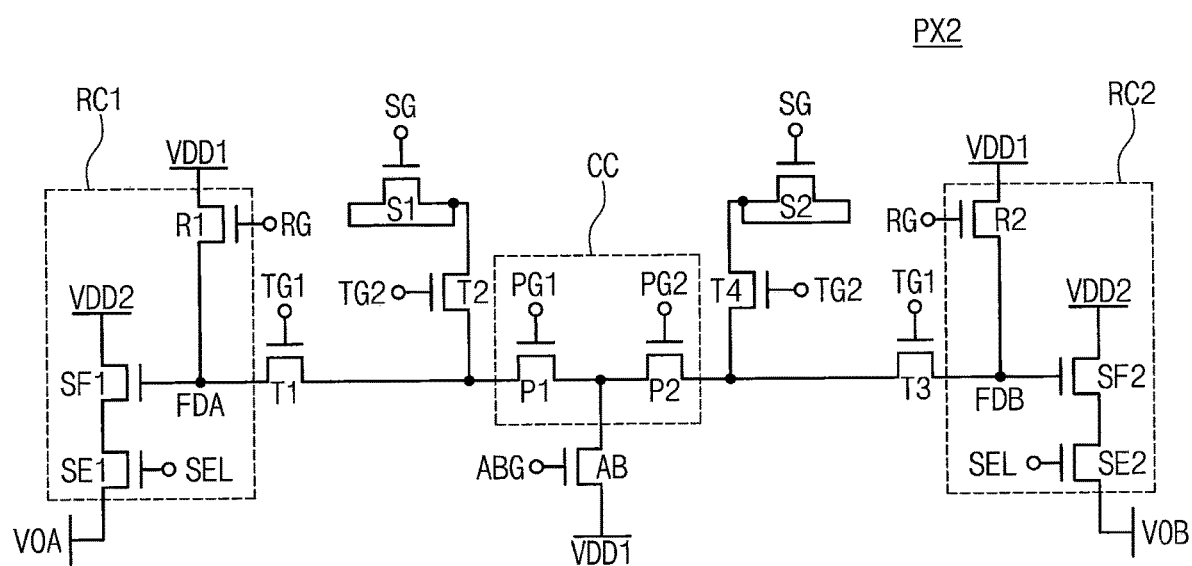
FIG. 12 is a circuit diagram of one of pixels included in a pixel array of FIG. 1 according to some embodiments of the inventive concept.

FIG. 12 is a circuit diagram of one of pixels included in a pixel array of FIG. 1 according to some embodiments of the inventive concept. Referring to FIG. 12, a pixel PX2 may include the charge collection circuit CC, the first, second, third and fourth transfer transistors T1, T2, T3, and T4 (or the transfer units), the first and second storage transistors S1 and S2 (or the storage units), the first and second read circuits RC1 and RC2, and the anti-blooming transistor AB. The charge collection circuit CC may include the first and second photo gate transistors P1 and P2. The remaining elements of the pixel PX2, except for the storage units S1 and S2 and the transfer units T1-T4, may have substantially the same features as those of FIG. 2, and a detailed description thereof will be omitted.

The storage units S1 and S2 may be used to store electric charges, which are collected in the charge collection circuit CC, during the sensing period, and to transfer the stored charges to the first and second floating diffusion nodes FDA and FDB (or the floating diffusion regions), during the transfer period. In the case where a voltage level of the storage control signal SG is adjusted, the electric charges stored in the storage units S1 and S2 may be transferred to the floating diffusion regions FDA and FDB in the sequentially divided manner.

The storage units S1 and S2 may be configured to have a shunt structure, unlike that shown in FIG. 2. During the sensing period, the first storage transistor S1 may store charges, which are transferred through the second transfer transistor T2. During the transfer period, the first storage transistor S1 may transfer charges to the first floating diffusion node FDA through the first and second transfer transistors T1 and T2. Source and drain regions of the first storage transistor S1 may be connected to the second transfer transistor T2.

During the sensing period, the second storage transistor S2 may store electric charges, which are transferred through the fourth transfer transistor T4. During the transfer period, the second storage transistor S2 may transfer electric charges to the second floating diffusion node FDB through the third and fourth transfer transistors T3 and T4. Source and drain regions of the second storage transistor S2 may be connected to the fourth transfer transistor T4.

Figure 13:
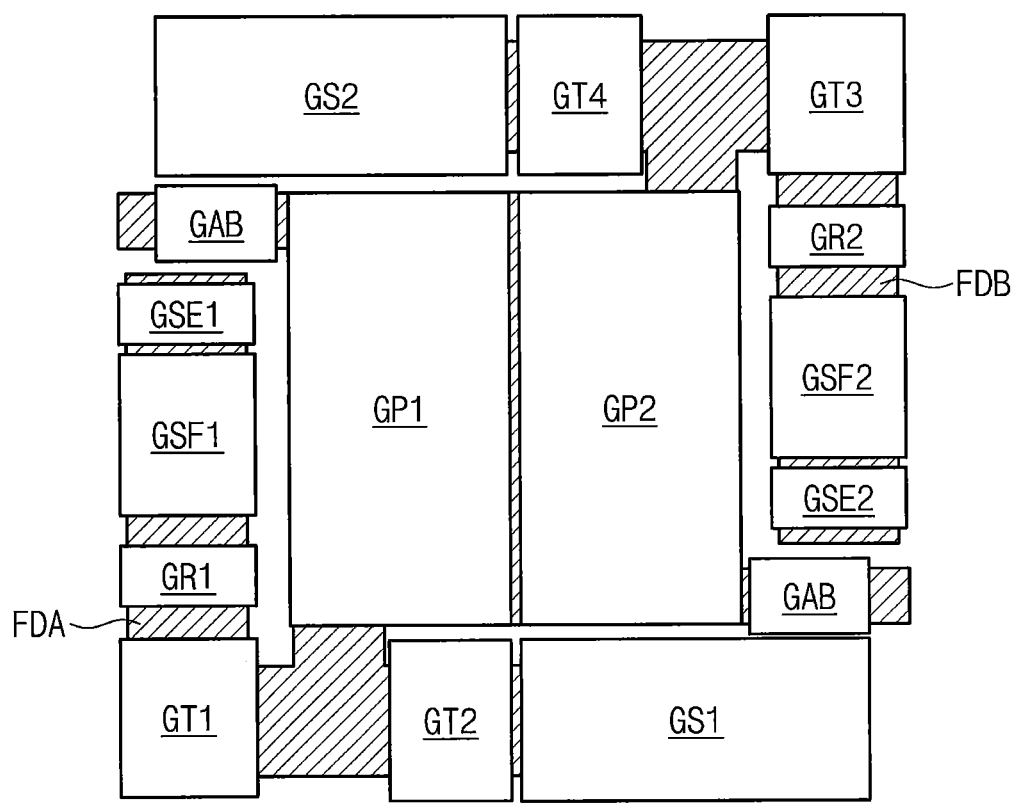
FIG. 13 is a layout of an example of the pixel of FIG. 12 according to some embodiments of the inventive concept.

FIG. 13 is a layout of the pixel of FIG. 12 according to some embodiments of the inventive concept. Referring to FIG. 13, the pixel PX2 may include the gate electrodes GP1 and GP2 of the first and second photo gate transistors P1 and P2, the gate electrodes GT1, GT2. Gt3, and GT4 of the first, second, third and fourth transfer transistors T1, T2, T3, and T4, the gate electrodes GS1 and GS2 of the first and second storage transistors S1 and S2, the gate electrodes GR1 and GR2 of the first and second reset transistors R1 and R2, the gate electrodes GSF1 and GSF2 of the first and second source follower transistors SF1 and SF2, the gate electrodes GSE1 and GSE2 of the first and second selection gate transistors SE1 and SE2, and the gate electrode GAB of the anti-blooming transistor AB. FIG. 13 illustrates an example of the layout of the pixel PX2, and the inventive concept is not limited to the layout of the pixel PX2 shown in FIG. 13.

When compared with FIG. 3, the first and second storage transistors S1 and S2 in the pixel PX2 of FIG. 13 may be provided on a path that is different from the charge transfer path. For example, the first storage transistor S1 and the second transfer transistor T2 may be arranged to be parallel to the first direction DR1, whereas the first transfer transistor T1, the first reset transistor R1, the first source follower transistor SF1, and the first selection transistor SE1 may be arranged to be parallel to the second direction DR2. In some embodiments, as shown in FIG. 13, the first storage transistor S1 and the second transfer transistor T2 may be spaced apart from each other in the first direction DR1, the first transfer transistor T1, the first reset transistor R1 may be spaced apart from each other in the second direction DR2, and the first source follower transistor SF1, and the first selection transistor SE1 may be spaced apart from each other in the second direction DR2.

Figure 14:
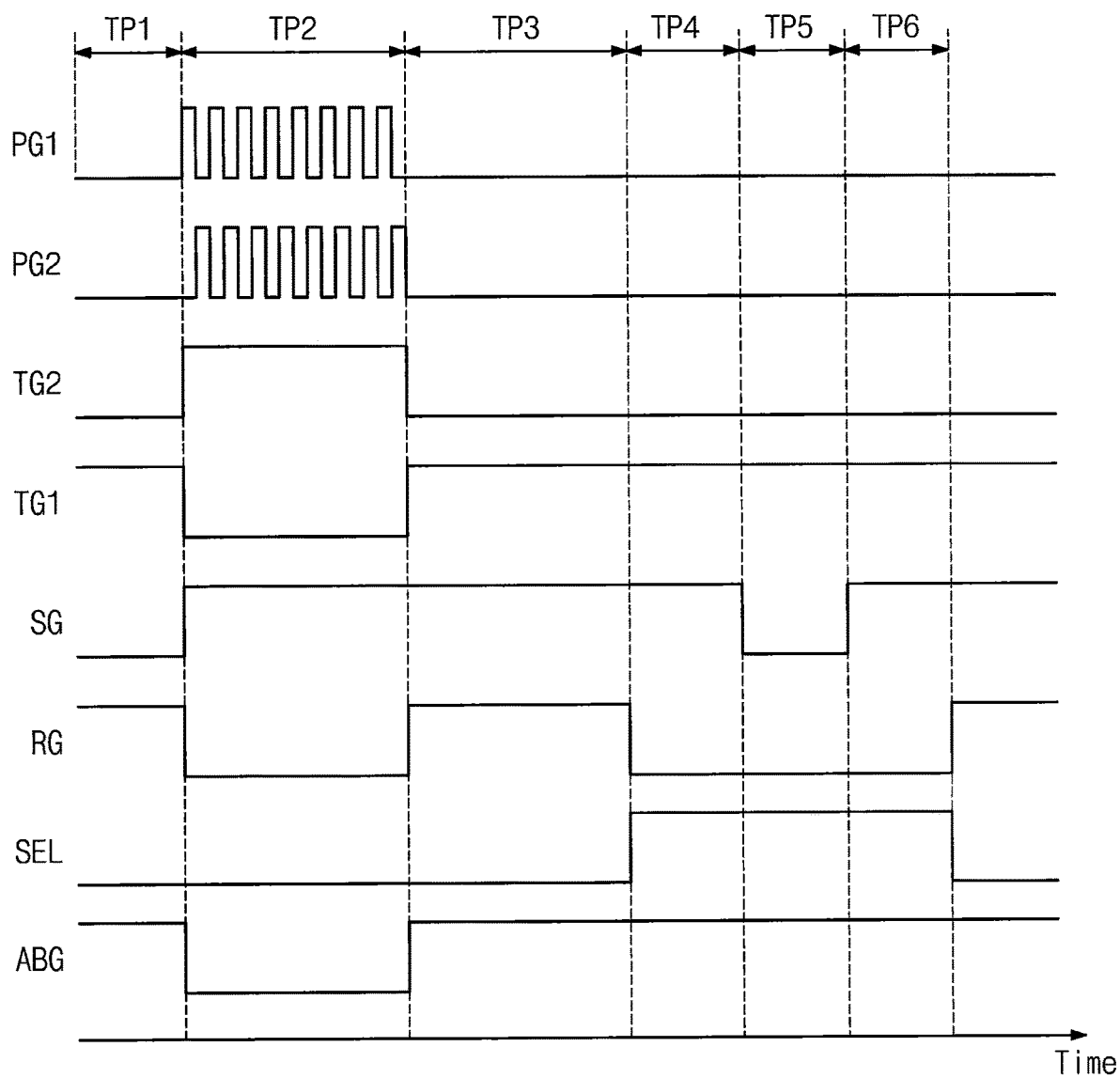
FIG. 14 is a timing diagram for the pixel of FIG. 12 according to some embodiments of the inventive concept.

FIG. 14 is a timing diagram for the pixel of FIG. 12 according to some embodiments of the inventive concept. In FIG. 14, the horizontal axis represents time, and the vertical axis represents magnitudes of signals to be applied to the pixel PX2 of FIG. 12. For convenience in description, a difference in an operating method, which is caused by a structural difference between the pixel PX1 of FIG. 2 and the pixel PX2 of FIG. 12, will be described in more detail with reference to FIG. 14.

During the sensing period or the second period TP2, the second and fourth transfer transistors T2 and T4 may be turned on by the second transfer control signal TG2 in the high-level state. Electric charges stored in the charge collection circuit CC may be transferred to the first and second storage transistors S1 and S2 through the second and fourth transfer transistors T2 and T4 in the turned-on state and may be stored in the first and second storage transistors S1 and S2.

After the second period TP2, the first transfer control signal TG1 may be in the high-level state, allowing the first and third transfer transistors T1 and T3 to be maintained to a turned-on state, and the second transfer control signal TG2 may be in the low-level state, allowing the second and fourth transfer transistors T2 and T4 to be maintained to a turned-off state. In other words, a voltage level of the storage control signal SG may be adjusted to change storage capacities of the first and second storage transistors S1 and S2 and thereby to control an amount of electric charges to be transferred to the first and second floating diffusion nodes FDA-FDB.

Figure 15:
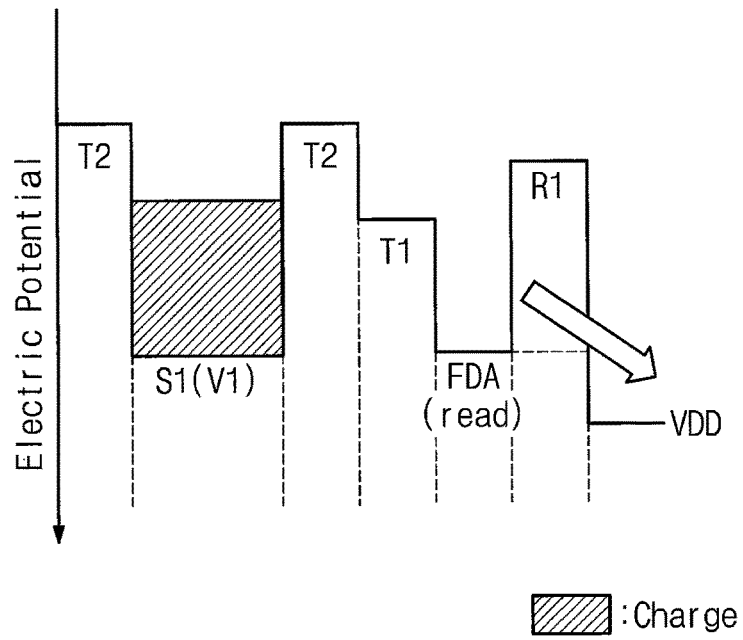
FIGS. 15 to 17 are diagrams illustrating an operation of storing and transferring charges, in accordance with the timing diagram of FIG. 14, according to some embodiments of the inventive concept.
Figure 16:
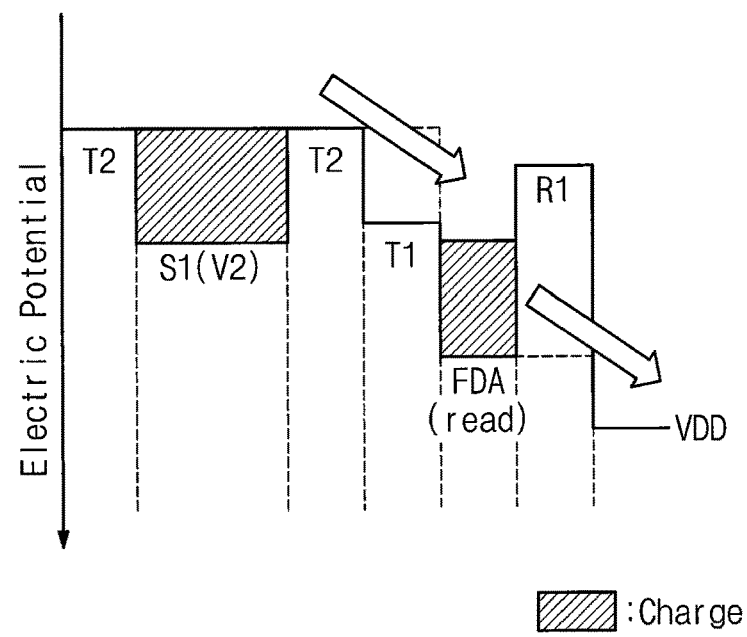
Figure 17:
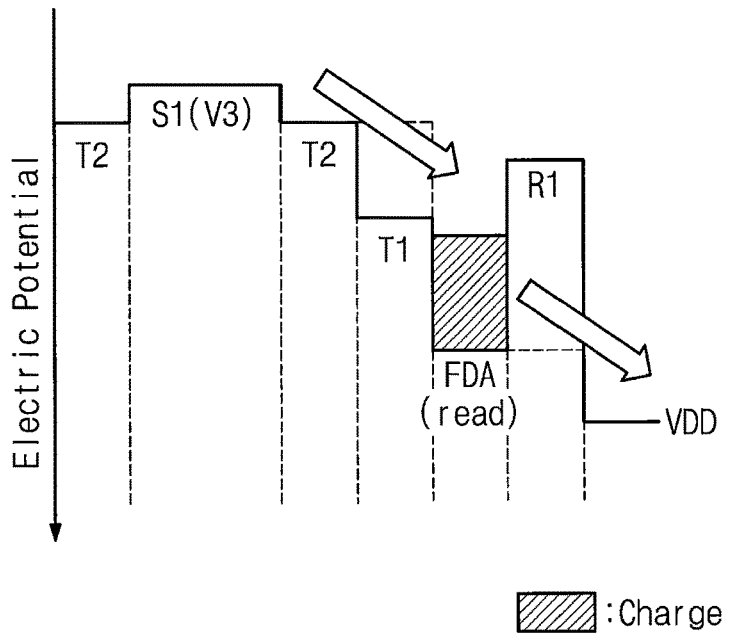

FIGS. 15 to 17 are diagrams illustrating an operation of storing and transferring charges, in accordance with the timing diagram of FIG. 14, according to some embodiments of the inventive concept. In the following description of FIGS. 15 to 17, an element previously described with reference to FIG. 14 may be identified by the same reference number.

FIG. 15 illustrates electric potentials of components (e.g., transistors), when the pixel is in the third and fourth periods TP3 and TP4 of FIG. 14. Referring to FIG. 15, during the second period TP2, electric charges may be stored in the first storage transistor S1. During the third period TP3, the second transfer control signal TG2 may be in the low-level state and the storage control signal SG may have the high level V1, and in this case, the electric charges, which are stored in the first storage transistor S1, may not be transferred to the second transfer transistor T2, and, in some embodiments, it may be possible to block (e.g., partially block, entirely block) or prevent the electric charges, which are stored in the first storage transistor S1, from being transferred to the second transfer transistor T2. Furthermore, the reset control signal RG in the high-level state may be applied to turn on the first reset transistor R1 and thereby to reset the first floating diffusion node FDA. A reset signal may be output to the bit line, based on the first floating diffusion node FDA, which is reset during the fourth period TP4.

FIG. 16 illustrates electric potentials of components, when the pixel is in the fifth and sixth periods TP5 and TP6 of FIG. 14. Referring to FIG. 16, during the fifth period TP5, the storage control signal SG may have the middle level V2, allowing the first storage transistor S1 to have a reduced storage capacity. Thus, some of the electric charges stored in the first storage transistor S1 may be transferred to the first floating diffusion node FDA through the first and second transfer transistors T1 and T2. In the case where, unlike that shown in FIG. 16, the incident light has a low intensity, an amount of the electric charges stored in the first storage transistor S1 may be less than a storage capacity of the first storage transistor S1 in the fifth period TP5, and hence, there may be no electric charge to be transferred to the first floating diffusion node FDA. During the sixth period TP6, an image signal may be produced, based on the electric charges stored in the first floating diffusion node FDA and then may be output to the bit line, and thereafter, the first floating diffusion node FDA may be reset.

FIG. 17 illustrates electric potentials of components, when the third to sixth periods TP3 to TP6 are repeated, after the sixth period TP6 of FIG. 14. Referring to FIG. 17, after the resetting of the first floating diffusion node FDA, a reset signal may be produced, based on the first floating diffusion node FDA in the reset state, and then may be output to the bit line. Thereafter, the storage control signal SG may have the low level V3, allowing the first storage transistor S1 to have a reduced storage capacity. At this time, the remaining electric charges stored in the first storage transistor S1 may be transferred to the first floating diffusion node FDA through the first and second transfer transistors T1 and T2. An image signal may be produced, based on the electric charges stored in the first floating diffusion node FDA and then may be output to the bit line, and thereafter, the first floating diffusion node FDA may be reset.

Figure 18:
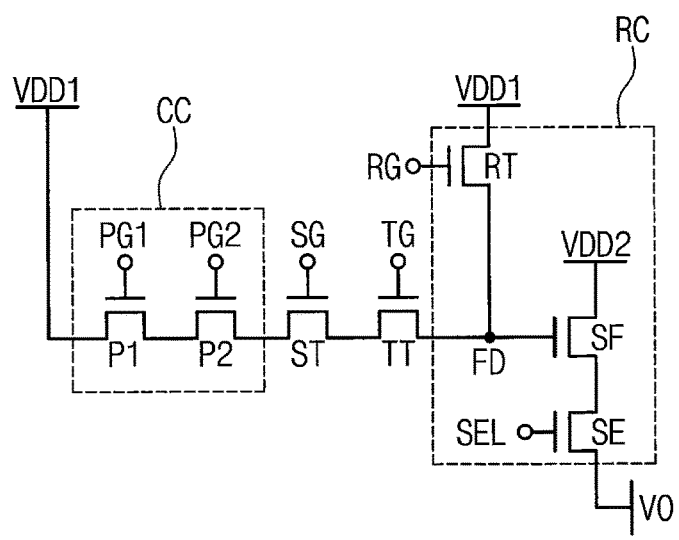
FIG. 18 is a circuit diagram of one of pixels included in the pixel array of FIG. 1 according to some embodiments of the inventive concept.

FIG. 18 is a circuit diagram of one of pixels included in a pixel array of FIG. 1. Referring to FIG. 18, a pixel PX3 may include the charge collection circuit CC, a transfer transistor TT (or a transfer unit), a storage transistor ST (or a storage unit), and a read circuit RC. The read circuit RC may include a reset transistor RT, a source follower transistor SF, and a selection transistor SE. When compared with FIG. 2, the pixel PX3 may include one storage transistor ST and one read circuit RC. In some embodiments, an anti-blooming transistor may not be provided in the pixel PX3.

The charge collection circuit CC may include the first and second photo gate transistors P1 and P2. Here, the first photo gate transistor P1 may include one terminal connected to the second photo gate transistor P2, an opposite terminal applied with the first driving voltage VDD1, and a gate terminal applied with the first photo gate signal PG1. In the first photo gate transistor P1, the collected charges may be discharged using the first driving voltage VDD1, unlike that shown in FIG. 2. The first photo gate transistor P1 may serve as the anti-blooming transistor AB of blocking (e.g., partially blocking, entirely blocking) or preventing the charge collection circuit CC from being affected by an external light.

The second photo gate transistor P2 may be configured to perform an operation of collecting additional charges, based on a change in phase of the second photo gate signal PG2. For example, when the second photo gate signal PG2 has the same phase as the irradiation light, the second photo gate transistor P2 may collect electric charges and transfer the electric charges to the storage transistor ST. After the discharging of the collected charges, the second photo gate signal PG2 may have a phase difference of 180° with respect to the irradiation light, and in this case, the second photo gate transistor P2 may collect electric charges and transfer the electric charges to the storage transistor ST. The charge collection operations performed by the second photo gate transistor P2 may be twice as many as that in the previous embodiments described with reference to FIG. 2, and this may lead to an increase in time taken to calculate the TOF value. However, it may be possible to reduce a size of the pixel PX3.

According to a voltage level of the storage control signal SG, the storage transistor ST may be used to store electric charges or to transfer the electric charges to a floating diffusion node FD. Although the storage transistor ST is illustrated to be connected in series between transfer transistor TT and the charge collection circuit CC, the storage transistor ST may be provided to have the shunt structure, like the first and second storage transistors S1 and S2 of FIG. 12.

Figure 19:
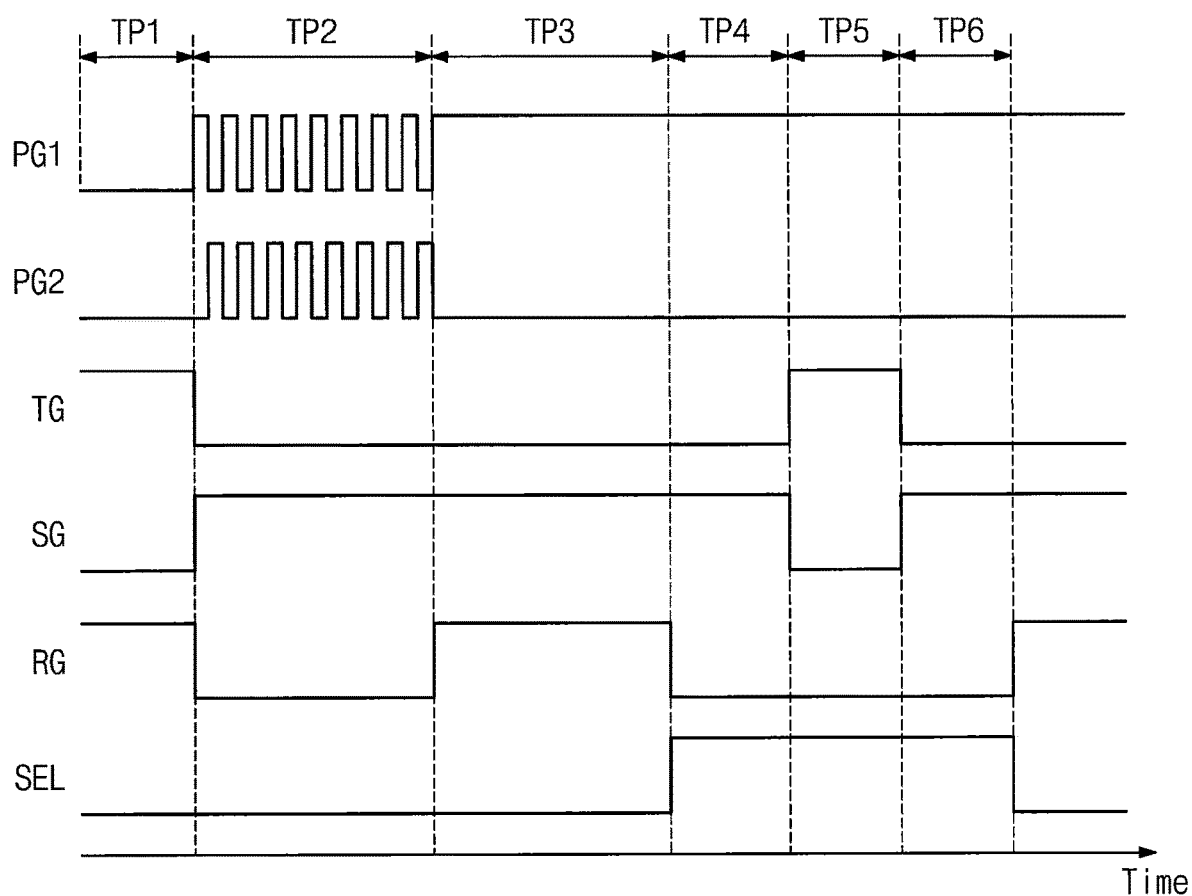
FIG. 19 is a timing diagram for the pixel of FIG. 18 according to some embodiments of the inventive concept.

FIG. 19 is a timing diagram for the pixel of FIG. 18 according to some embodiments of the inventive concept. In FIG. 19, the horizontal axis represents time, and the vertical axis represents magnitudes of the first and second photo gate signals PG1 and PG2, the transfer control signal TG, the storage control signal SG, the reset control signal RG, and the selection signal SEL of FIG. 18.

During the sensing period or the second period TP2, electric charges may be collected, based on the second photo gate signal PG2 in the high-level state, and the collected charges may be removed, based on the first photo gate signal PG1 in the high-level state. The electric charges collected by the second photo gate transistor P2 may be stored in the storage transistor ST.

After the second period TP2, an external light may be removed based on the first photo gate signal PG1 in the high-level state. The second photo gate signal PG2, the transfer control signal TG, the storage control signal SG, the reset control signal RG, and the selection signal SEL may be operated in the same manner as described with reference to FIG. 6.

Figure 20:
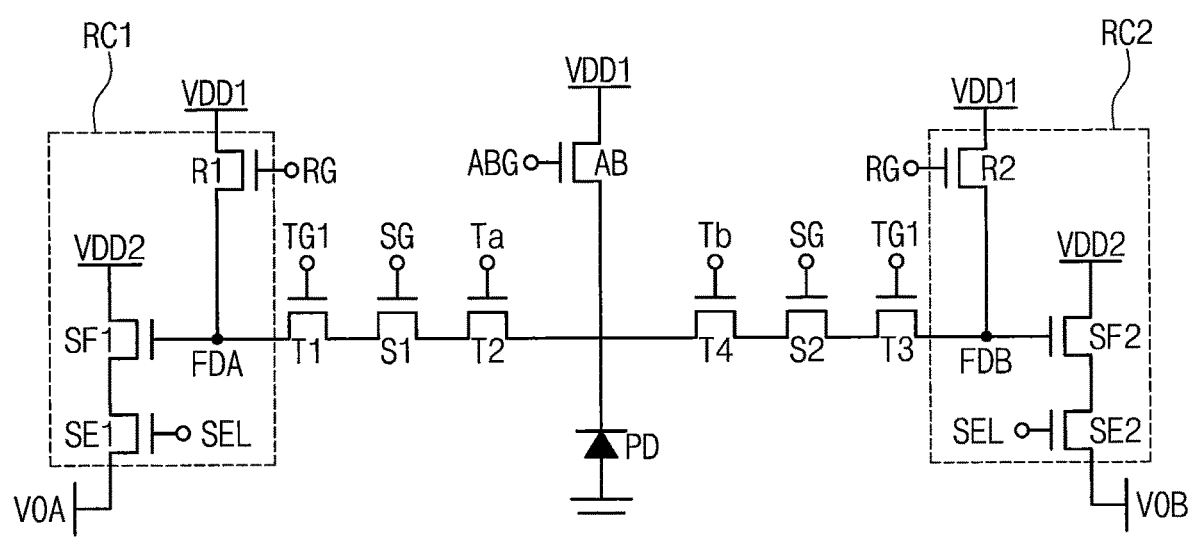
FIG. 20 is a circuit diagram of one of pixels included in the pixel array of FIG. 1 according to some embodiments of the inventive concept.

FIG. 20 is a circuit diagram of one of pixels included in a pixel array of FIG. 1. Referring to FIG. 20, a pixel PX4 may include a photodiode PD, the first to fourth transfer transistors T1-T4 (or transfer units), the first and second storage transistors S1-S2 (or storage units), the first and second read circuits RC1 and RC2, and the anti-blooming transistor AB. In the pixel PX4, the photodiode PD may be used instead of the charge collection circuit CC in the pixel PX1 of FIG. 2, and except for this difference, the pixel PX4 may have substantially the same structure as the pixel PX1 of FIG. 2.

The photodiode PD may be configured to sense an incident light (i.e., to convert the incident light into electric signals). However, the second and fourth transfer transistors T2 and T4 may be used to store electric charges in the first storage transistor S1 and the second storage transistor S2, respectively, like the charge collection circuit CC. During the sensing period, the second transfer transistor T2 may transfer the electric signal to the first storage transistor S1 in response to a first transfer signal Ta, and the fourth transfer transistor T4 may transfer the electric signal to the second storage transistor S2 in response to a second transfer signal Tb. Similar to the first and second photo gate signals PG1 and PG2 of FIG. 2, the first and second transfer signals Ta and Tb may be toggled, while maintaining phases opposite to each other. Thus, the electric signal may be divided, like the charge collection circuit CC of FIG. 2.

According to some embodiments of the inventive concept, image sensors, image detecting systems including the image sensors, and methods of operating the image sensors may be provided. The image sensors may include a storage transistor, which is configured to control a charge storage capacity. The use of the storage transistor may allow the image sensor to calculate a TOF value with reliability and to have an optimized pixel structure.

While example embodiments of the inventive concepts have been particularly shown and described, it will be understood by one of ordinary skill in the art that variations in form and detail may be made therein without departing from the spirit and scope of the attached claims. Thus, to the maximum extent allowed by law, the scope is to be determined by the broadest permissible interpretation of the following claims and their equivalents, and shall not be restricted or limited by the foregoing detailed description.

What is claimed is:

1. An image sensor comprising:
a pixel configured to generate an image signal in response to light incident on the pixel, wherein the pixel comprises:
a charge collection circuit configured to collect charges, which are produced by the light incident on the pixel, during a sensing period;
a floating diffusion region; and
a storage transistor configured to store the charges during the sensing period and, during a transfer period after the sensing period, configured to transfer at least a portion of the charges to the floating diffusion region,
wherein an amount of charges that is transferred from the storage transistor to the floating diffusion region is controlled by a voltage level of a storage control signal that is applied to a gate of the storage transistor,
wherein the storage transistor is configured to have a first charge storage capacity during the sensing period and is configured to have a second charge storage capacity during the transfer period, and
wherein the first charge storage capacity is higher than the second charge storage capacity.

2. The image sensor of claim 1, wherein the transfer period comprises a first transfer period and a second transfer period following the first transfer period, and wherein the storage transistor is further configured to transfer a first portion of the charges to the floating diffusion region in response to a first voltage level of the storage control signal during the first transfer period and is further configured to transfer a second portion of the charges to the floating diffusion region in response to a second voltage level of the storage control signal during the second transfer period.

3. The image sensor of claim 1, wherein the storage transistor is further configured to store the charges in response to a first voltage level of the storage control signal during the sensing period and is further configured to transfer the at least the portion of the charges to the floating diffusion region in response to a second voltage level of the storage control signal during the transfer period, and
wherein the first voltage level is higher than the second voltage level.

4. The image sensor of claim 1, wherein the pixel further comprises a transfer unit, which is connected between the charge collection circuit and the storage transistor, and
wherein the transfer unit is configured to transfer the charges from the charge collection circuit to the storage transistor during the sensing period and is configured to block the charges from being transferred from the storage transistor to the charge collection circuit during the transfer period.

5. The image sensor of claim 1, wherein the pixel further comprises a transfer unit between the charge collection circuit and the floating diffusion region, and
wherein the transfer unit is configured to transfer the charges from the charge collection circuit to the storage transistor during the sensing period and is configured to transfer the at least the portion of the charges from the storage transistor to the floating diffusion region during the transfer period.

6. The image sensor of claim 1, wherein the pixel further comprises a transfer unit, which is connected between the storage transistor and the floating diffusion region, and
wherein the transfer unit is configured to block the charges from being transferred from the storage transistor to the floating diffusion region during the sensing period and is configured to transfer the at least the portion of the charges from the storage transistor to the floating diffusion region during the transfer period.

7. The image sensor of claim 1, wherein the charge collection circuit comprises:
a first photo gate transistor configured to collect a first portion of the charges in response to a first photo gate signal that is toggled; and
a second photo gate transistor configured to collect a second portion of the charges in response to a second photo gate signal whose phase is opposite to that of the first photo gate signal.

8. The image sensor of claim 7, wherein the storage transistor comprises:
a first storage transistor configured to store the first portion of the charges during the sensing period and configured to transfer the first portion of the charges to a first floating diffusion node of the floating diffusion region during the transfer period; and
a second storage transistor configured to store the second portion of the charges during the sensing period and configured to transfer the second portion of the charges to a second floating diffusion node of the floating diffusion region during the transfer period.

9. The image sensor of claim 7, wherein the storage transistor comprises:

a first storage transistor configured to store the first portion of the charges during the sensing period and configured to transfer the first portion of the charges to the floating diffusion region during the transfer period; and a second storage transistor configured to store the second portion of the charges during the sensing period and configured to transfer the second portion of the charges to the floating diffusion region during the transfer period.

10. The image sensor of claim 7, wherein the second photo gate transistor is connected to the storage transistor and is configured to transfer the second portion of the charges to the storage transistor during the sensing period, and wherein the first photo gate transistor is configured to block charges, which are produced after the sensing period, from being transferred to the second photo gate transistor.

11. An image detecting system comprising:

a light source configured to emit an irradiation light in response to a first clock signal;

an image sensor including a pixel, which is configured to sense a fraction of the irradiation light reflected by a subject and is configured to produce an image signal in response to the first clock signal and a second clock signal during a sensing period, the first and second clock signals having opposite phases during the sensing period; and a processor configured to calculate a distance between the image sensor and the subject, based on the image signal, wherein the pixel comprises:

a charge collection circuit configured to collect first charges, which are produced by an incident light, in response to the first clock signal, and configured to collect second charges, which are produced by the incident light, in response to the second clock signal, during the sensing period;

a floating diffusion region;

a storage transistor configured to store the first charges or the second charges during the sensing period and configured to transfer at least a portion of the first charges or at least a portion of the second charges to the floating diffusion region, based on a voltage level of a storage control signal that is applied to a gate of the storage transistor; and a read circuit configured to produce the image signal, based on the at least the portion of the first charges or the at least the portion of the second charges transferred to the floating diffusion region, wherein the storage transistor is configured to have a first charge storage capacity during the sensing period and is configured to have a second charge storage capacity during the transfer of the at least the portion of the first charges or the at least the portion of the second charges to the floating diffusion region, and wherein the first charge storage capacity is higher than the second charge storage capacity.

12. The image detecting system of claim 11, wherein the storage transistor comprises:

a first storage transistor configured to store the first charges based on the storage control signal; and a second storage transistor configured to store the second charges based on the storage control signal, wherein the storage control signal is applied to gates of the first and second storage transistors, and wherein the first and second storage transistors are configured to adjust amounts of charges, which are transferred to the floating diffusion region based on the voltage level of the storage control signal.

13. The image detecting system of claim 11, wherein the charge collection circuit comprises:

a first photo gate transistor configured to collect the first charges, which are produced by the fraction of the irradiation light, based on a first photo gate signal synchronized with the first clock signal; and a second photo gate transistor configured to collect the second charges, which are produced by the fraction of the irradiation light, based on a second photo gate signal synchronized with the second clock signal.

14. The image detecting system of claim 11, wherein the light source is configured to emit the irradiation light having a specific pattern, and wherein the charge collection circuit comprises:

a first photo gate transistor configured to collect the first charges, which are produced by a first sensing light including the fraction of the irradiation light, in response to a first photo gate signal produced based on the first clock signal; and a second photo gate transistor configured to collect the second charges, which are produced by a second sensing light, in response to a second photo gate signal produced based on the second clock signal.

15. A method of operating an image sensor, wherein the image sensor comprises a pixel configured to generate an image signal in response to an incident light, and wherein the pixel comprises a storage transistor and a floating diffusion node, and wherein the method comprises:

collecting charges, which are produced by the incident light, in the pixel;

storing the charges in the storage transistor, in response to a first storage control signal applied to a gate of the storage transistor, during the collecting of the charges in the pixel;

transferring the charges to the floating diffusion node, in response to a second storage control signal having a voltage level lower than the first storage control signal; and producing the image signal, based on the charges transferred to the floating diffusion node, wherein the storage transistor has a first charge storage capacity during the collecting of the charges in the pixel and has a second charge storage capacity during the transferring of the charges to the floating diffusion node, and wherein the first charge storage capacity is higher than the second charge storage capacity.

16. The method of claim 15, wherein the charges comprise first storage charges and second storage charges, and wherein the transferring the charges to the floating diffusion node comprises:

applying the second storage control signal having a first voltage level to the gate of the storage transistor to transfer the first storage charges to the floating diffusion node, based on the first voltage level; and applying the second storage control signal having a second voltage level that is lower than the first voltage level to the gate of the storage transistor to transfer the second storage charges to the floating diffusion node, based on the second voltage level.

17. The method of claim 16, wherein producing the image signal comprises:
producing a first image signal based on the first storage charges transferred to the floating diffusion node;
resetting the floating diffusion node to discharge the first storage charges from the floating diffusion node;
producing a second image signal based on the second storage charges transferred to the floating diffusion node; and
resetting the floating diffusion node to discharge the second storage charges from the floating diffusion node.

18. The image sensor of claim 1, wherein the storage transistor consists of a single storage transistor.

* * * * *